US011217235B1

(12) United States Patent
Chu et al.

(10) Patent No.: US 11,217,235 B1
(45) Date of Patent: Jan. 4, 2022

(54) AUTONOMOUSLY MOTILE DEVICE WITH AUDIO REFLECTION DETECTION

(71) Applicant: Amazon Technologies, Inc., Seattle, WA (US)

(72) Inventors: Wai Chung Chu, San Jose, CA (US); Anshuman Ganguly, Cambridge, MA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 16/686,808

(22) Filed: Nov. 18, 2019

(51) Int. Cl.
| | | |
|---|---|---|
| *G10L 15/20* | (2006.01) | |
| *G10L 25/21* | (2013.01) | |
| *H04R 1/40* | (2006.01) | |
| *H04R 3/00* | (2006.01) | |
| *G10L 21/0232* | (2013.01) | |
| *G10L 15/22* | (2006.01) | |
| *G05D 1/00* | (2006.01) | |
| *G10L 25/84* | (2013.01) | |
| *G10L 21/0208* | (2013.01) | |

(52) U.S. Cl.
CPC .......... *G10L 15/20* (2013.01); *G05D 1/0016* (2013.01); *G05D 1/0088* (2013.01); *G10L 15/22* (2013.01); *G10L 21/0232* (2013.01); *G10L 25/21* (2013.01); *G10L 25/84* (2013.01); *H04R 1/406* (2013.01); *H04R 3/005* (2013.01); *G10L 2021/02082* (2013.01)

(58) Field of Classification Search
CPC ......... G10L 15/20; G10L 15/22; G10L 25/84; G10L 25/21; G10L 21/0232; G10L 2021/02082; G10L 25/81; G10L 25/78; G10L 2015/02166; G10L 2015/223; G10L 25/51; G10L 21/028; G10L 21/0272; G10L 21/81; H04R 3/005; H04R 1/406; H04R 2201/401; H04R 2201/403; H04R 2430/20; G05D 1/0088; G05D 1/0016; A47L 11/24; A47L 11/4011; A47L 11/4061; A47L 11/4091; A47L 2201/04; B25J 9/0003; G06F 3/167
See application file for complete search history.

(56) References Cited

U.S. PATENT DOCUMENTS

| | | | |
|---|---|---|---|
| 9,685,171 B1 * | 6/2017 | Yang | ................. G10L 21/0208 |
| 9,689,960 B1 * | 6/2017 | Barton | ..................... G01S 3/86 |
| 2015/0380010 A1 * | 12/2015 | Srinivasan | ............. H04R 3/005 704/227 |
| 2017/0361468 A1 * | 12/2017 | Cheuvront | ................ G06F 3/16 |
| 2018/0154514 A1 * | 6/2018 | Angle | ..................... G16H 20/13 |
| 2018/0218747 A1 * | 8/2018 | Moghimi | ............ G10L 21/0272 |

* cited by examiner

*Primary Examiner* — Yogeshkumar Patel
(74) *Attorney, Agent, or Firm* — Pierce Atwood LLP

(57) ABSTRACT

A device capable of autonomous motion may move in response to a user speaking an utterance, such as a command. Before moving, the device processes audio data received from a microphone array to identify different audio signals arriving at the device from different directions. Based on properties of the audio signals, the device determines which of the audio signals are merely reflections of other audio.

22 Claims, 31 Drawing Sheets

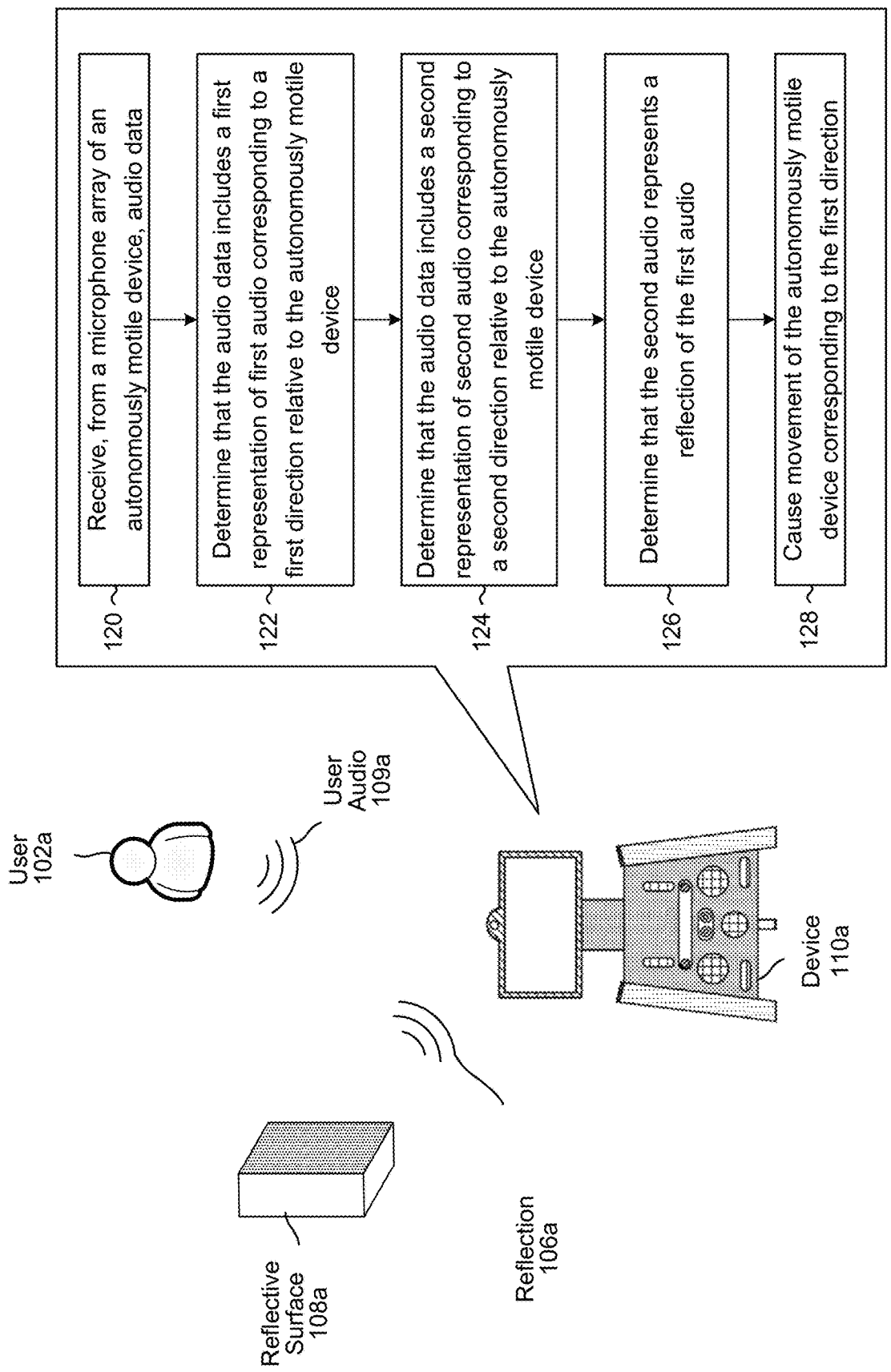

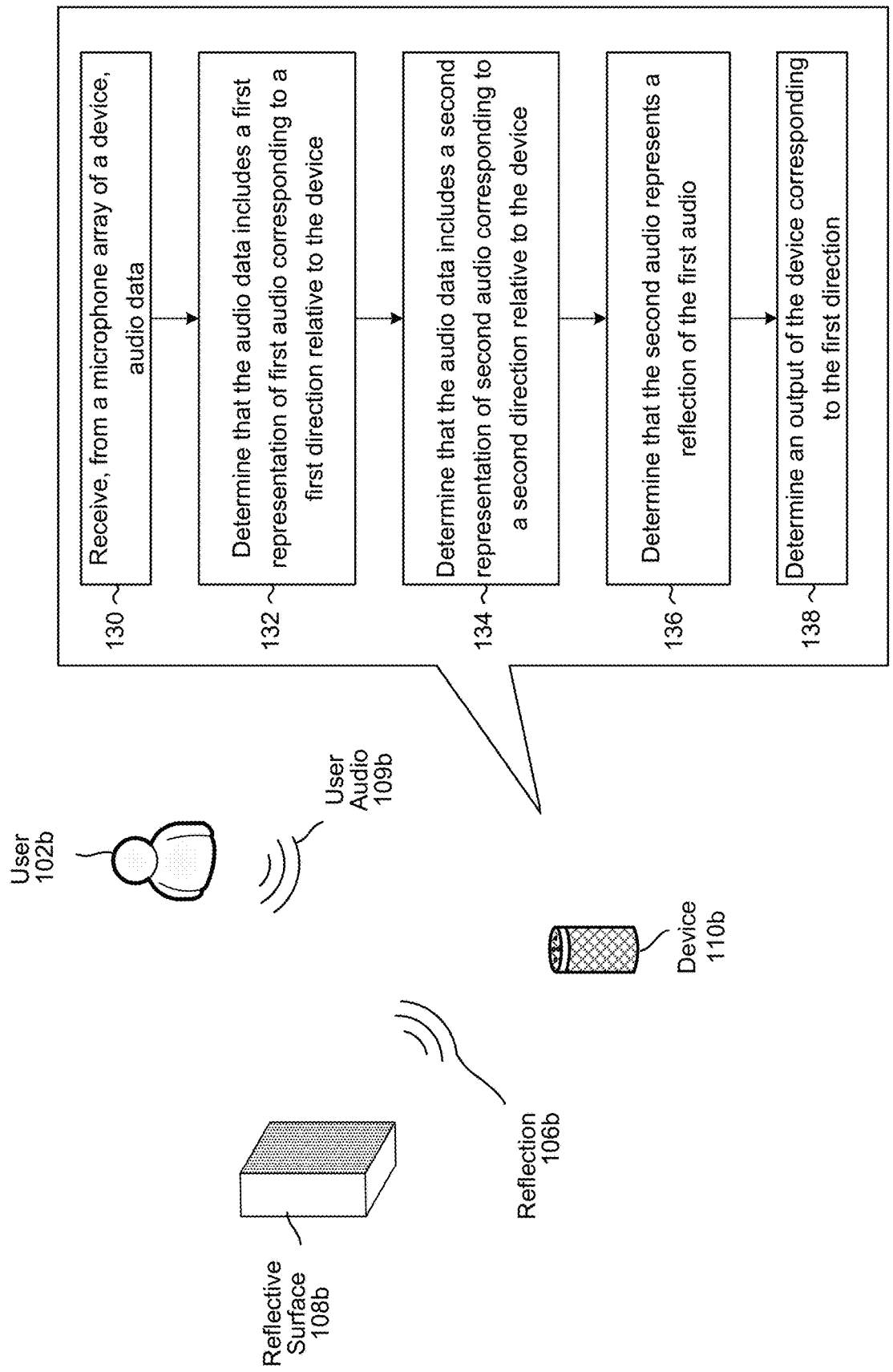

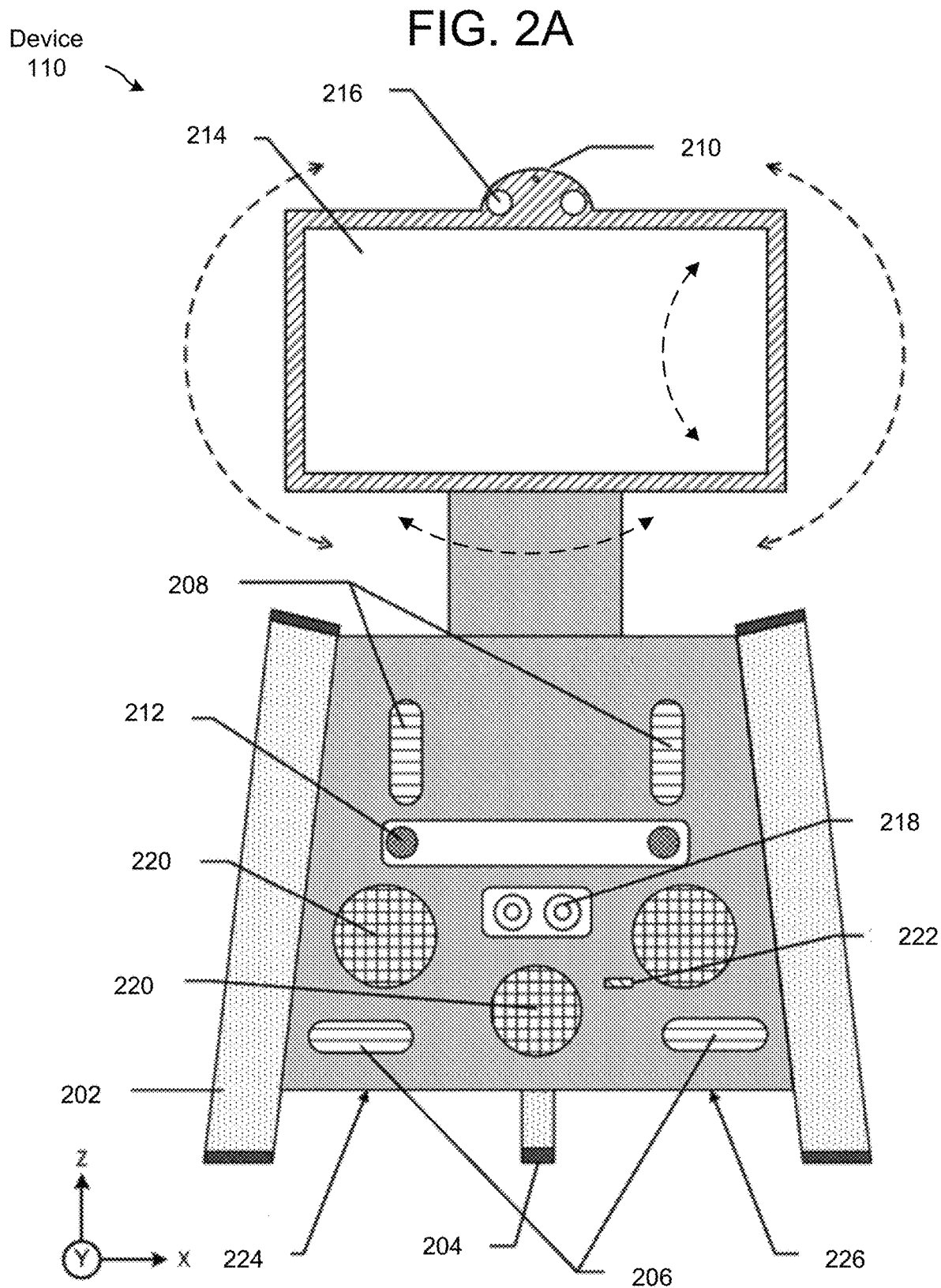

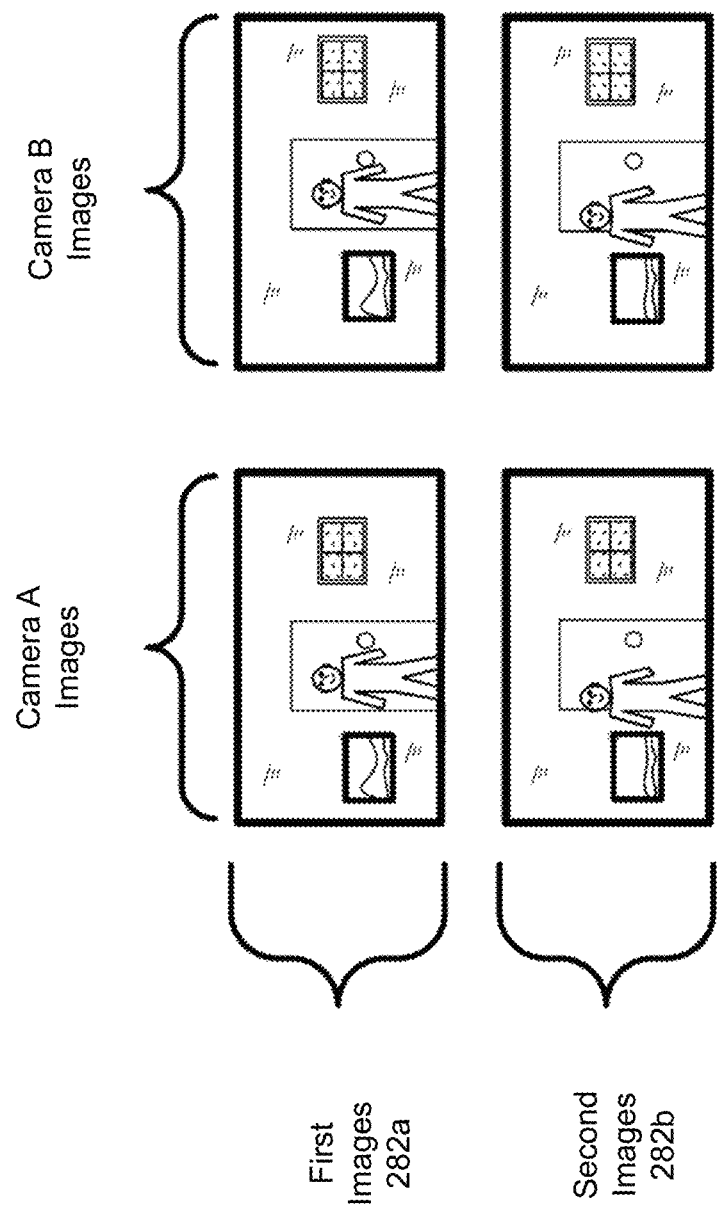

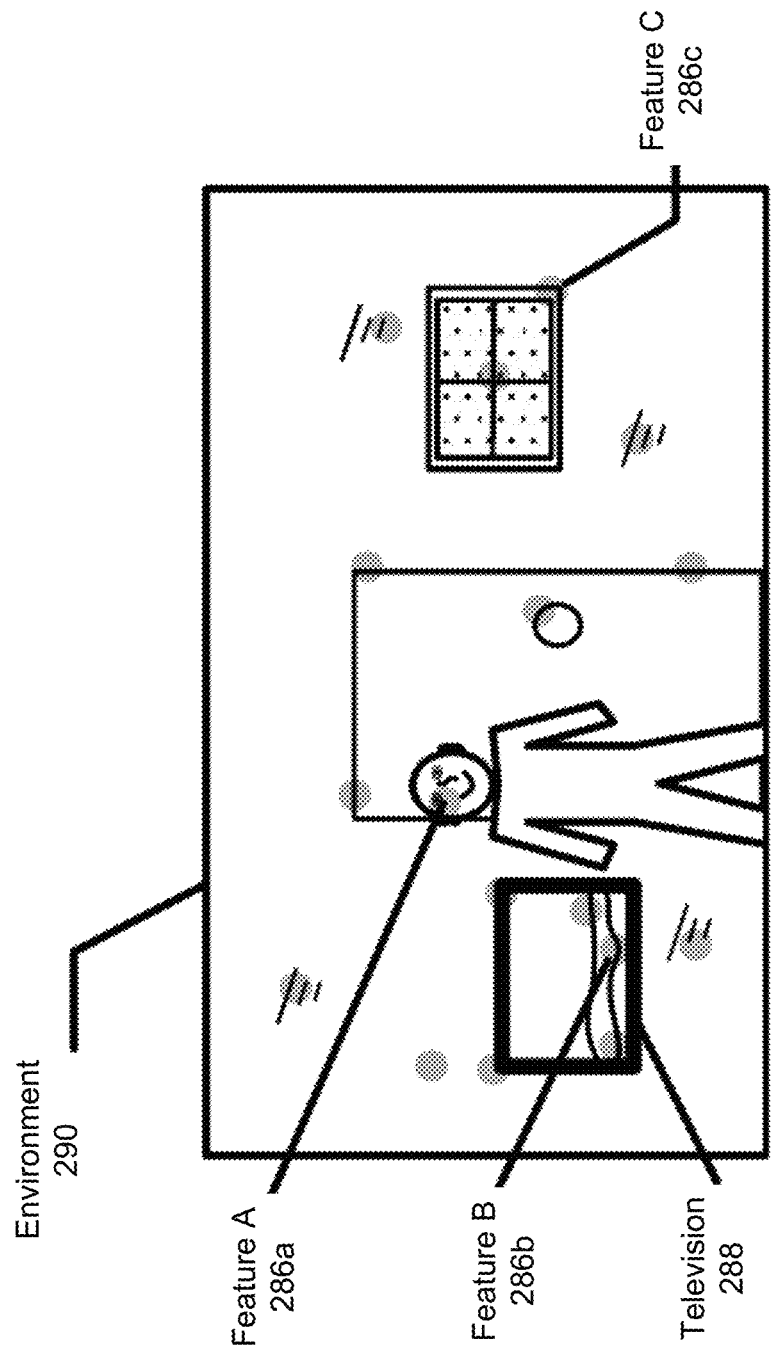

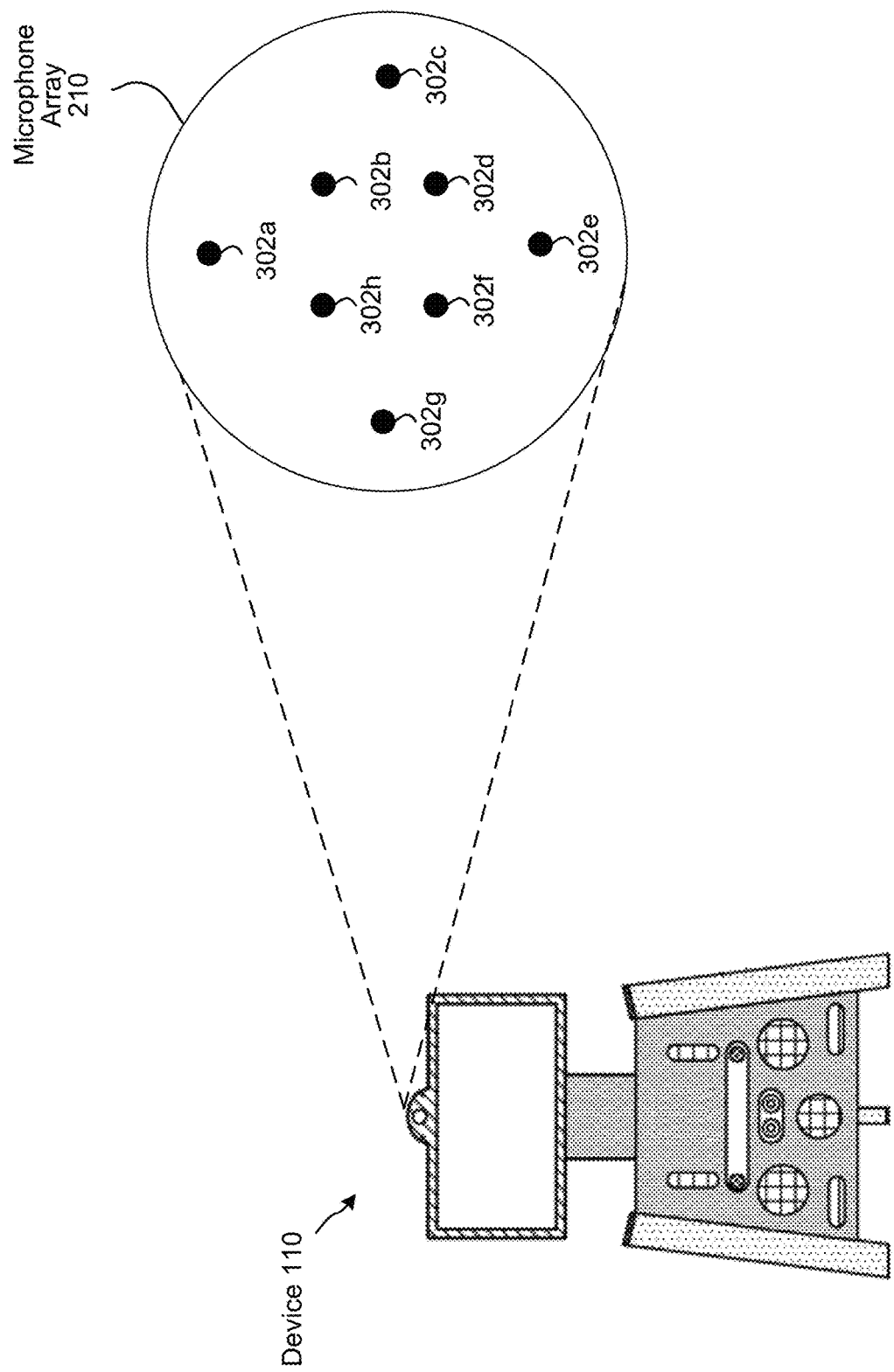

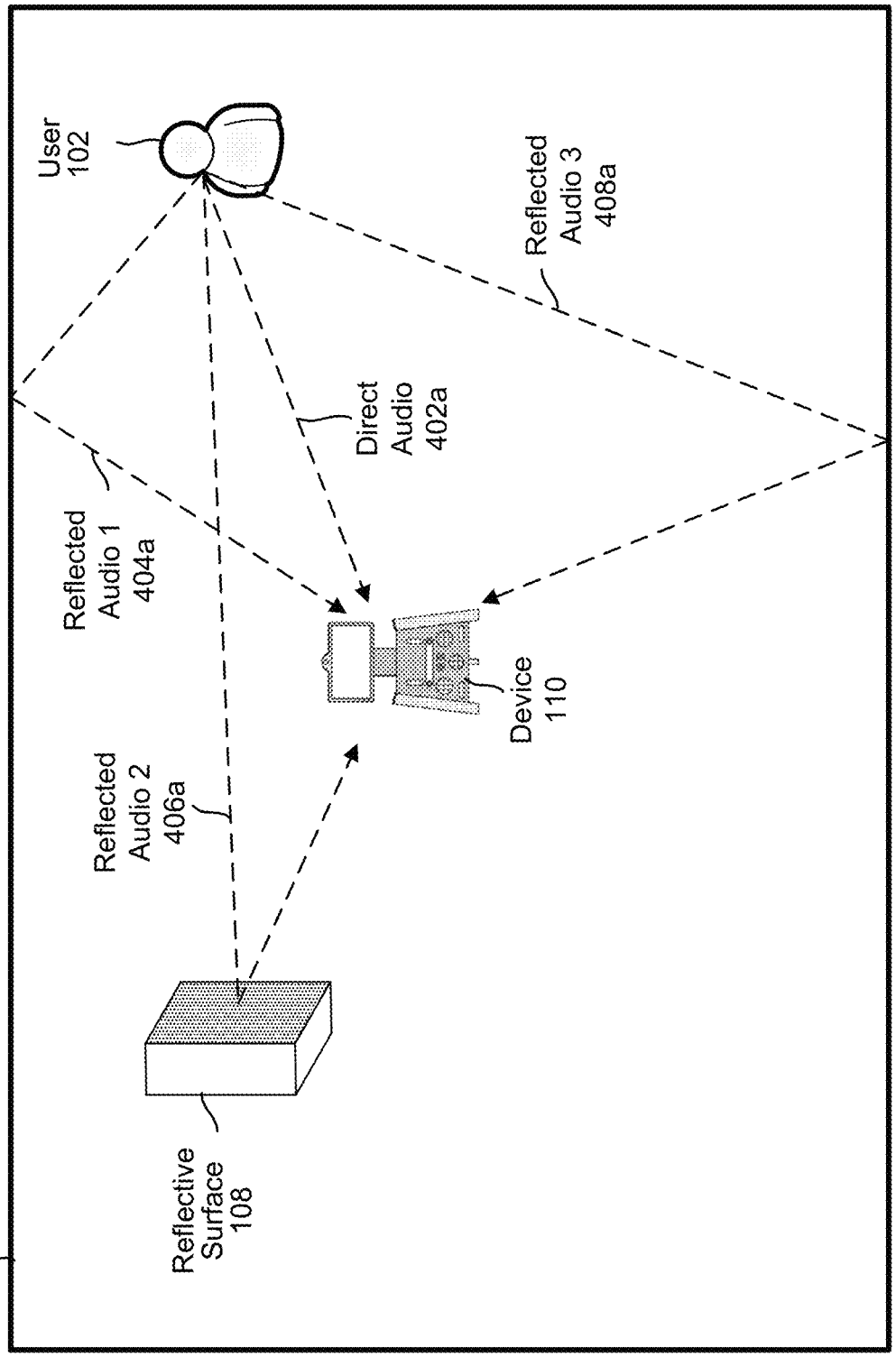

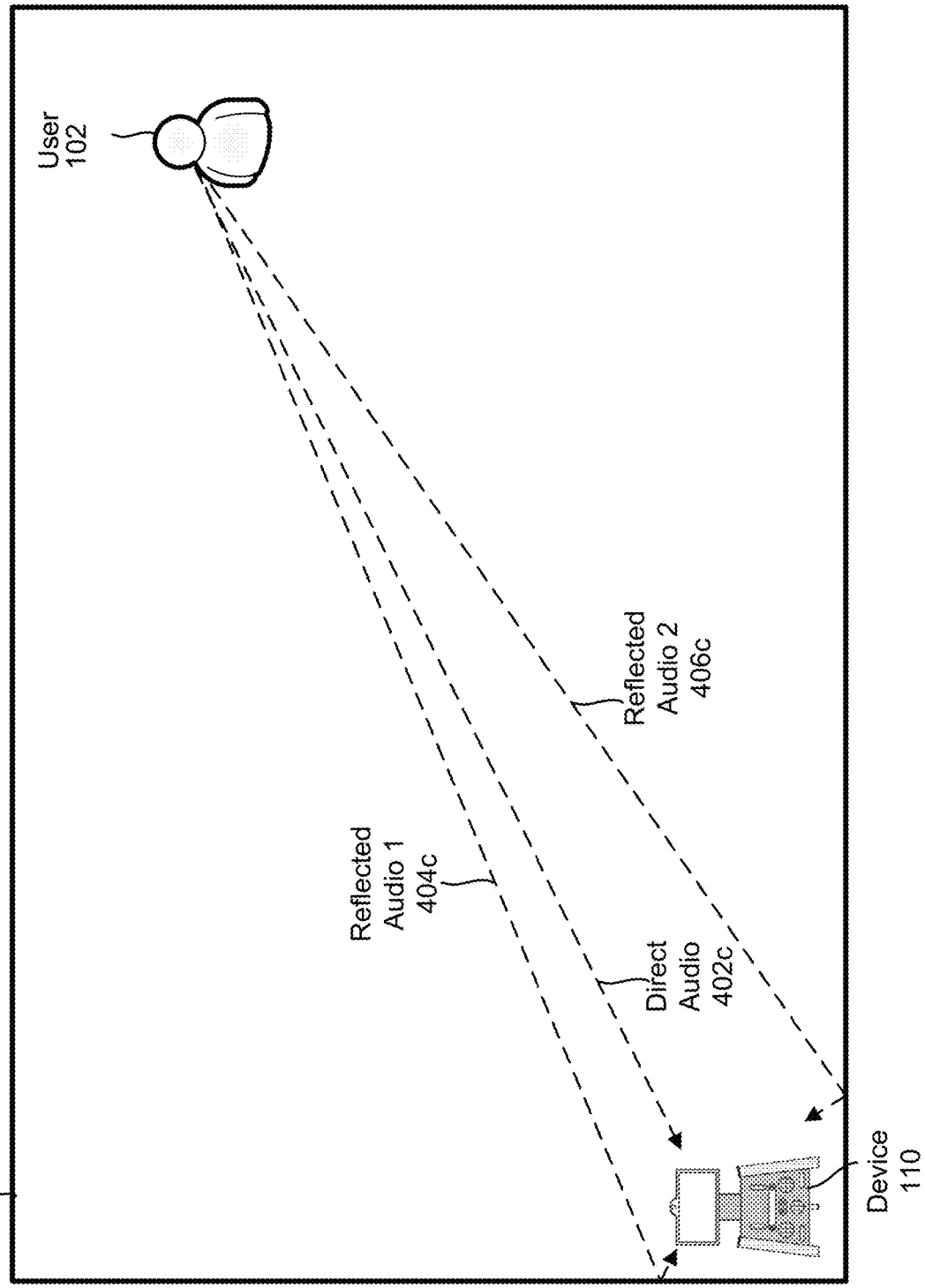

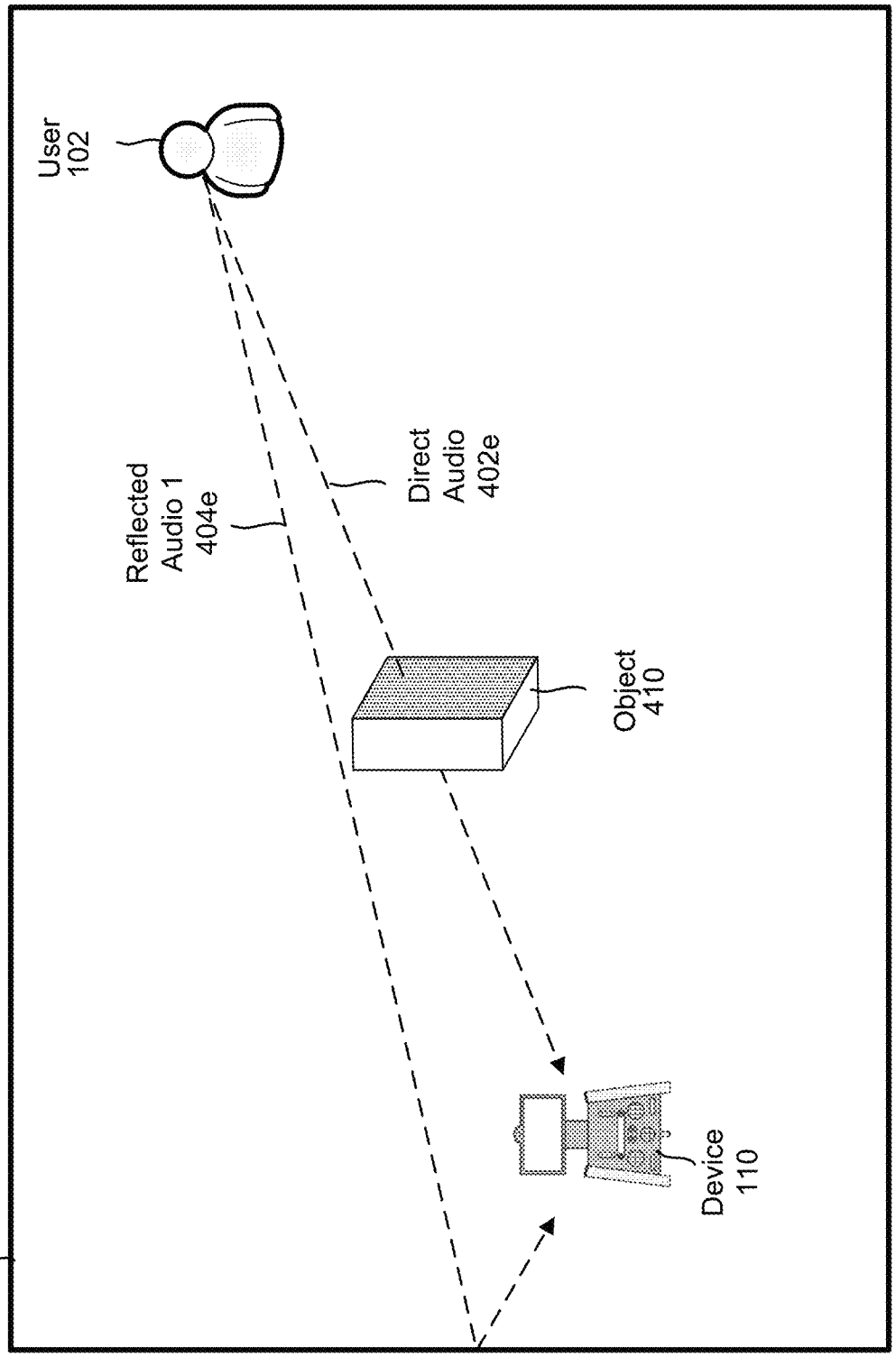

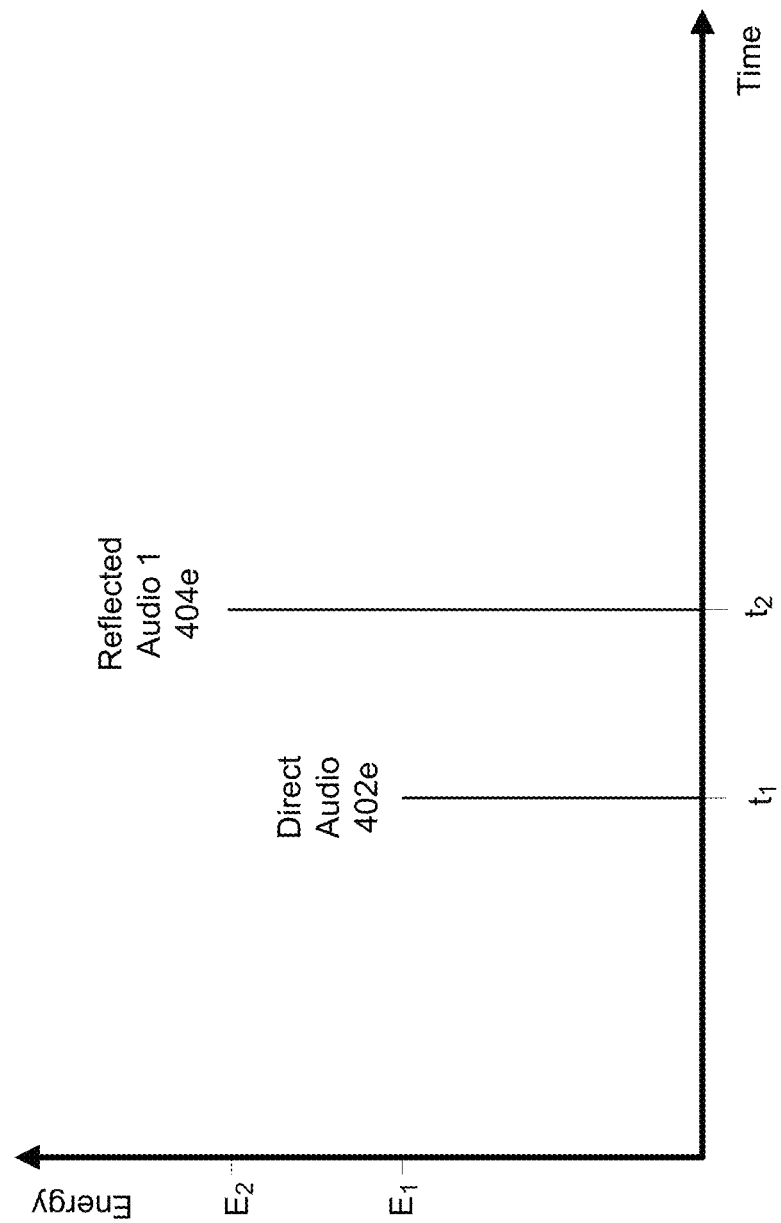

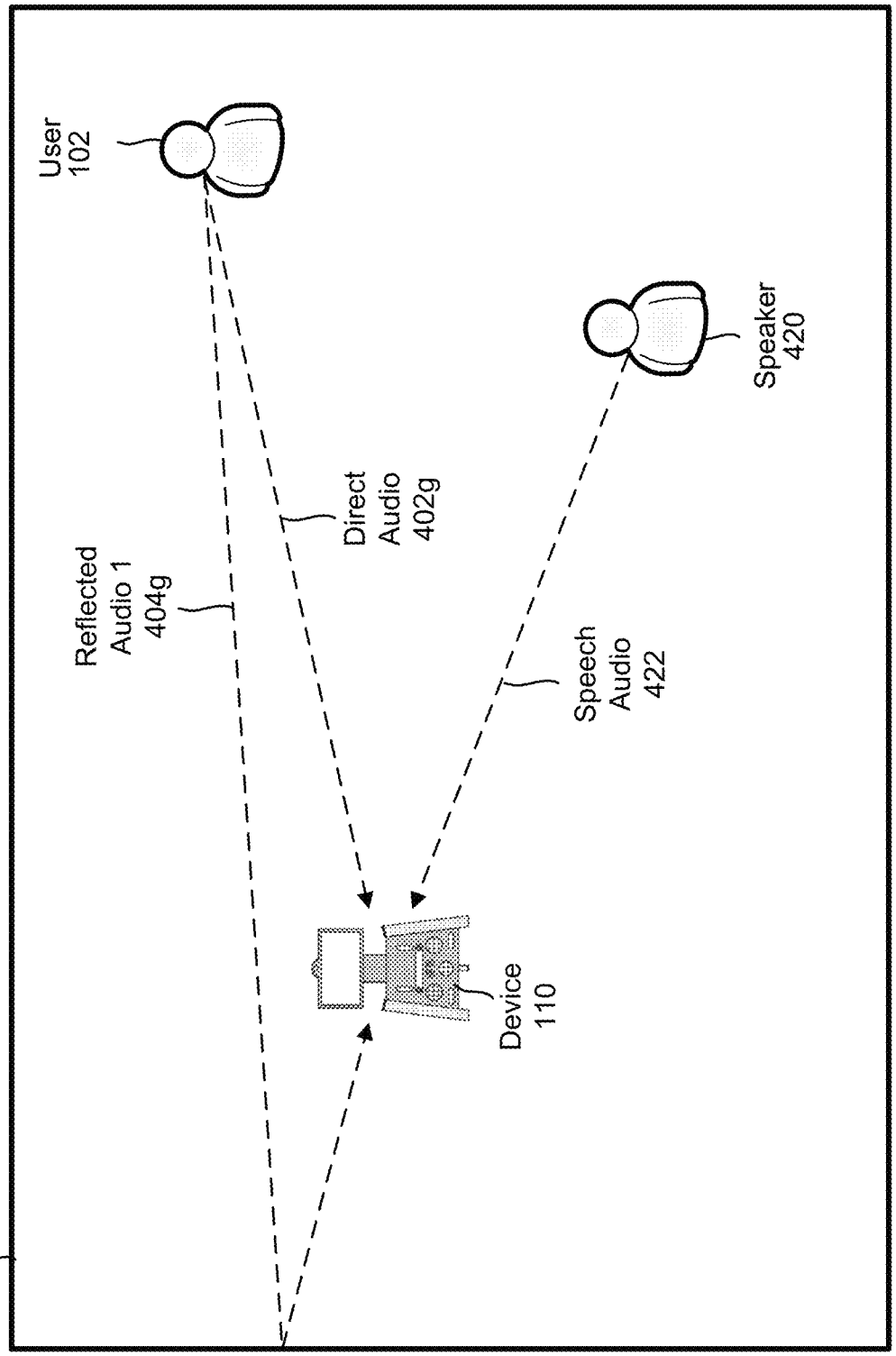

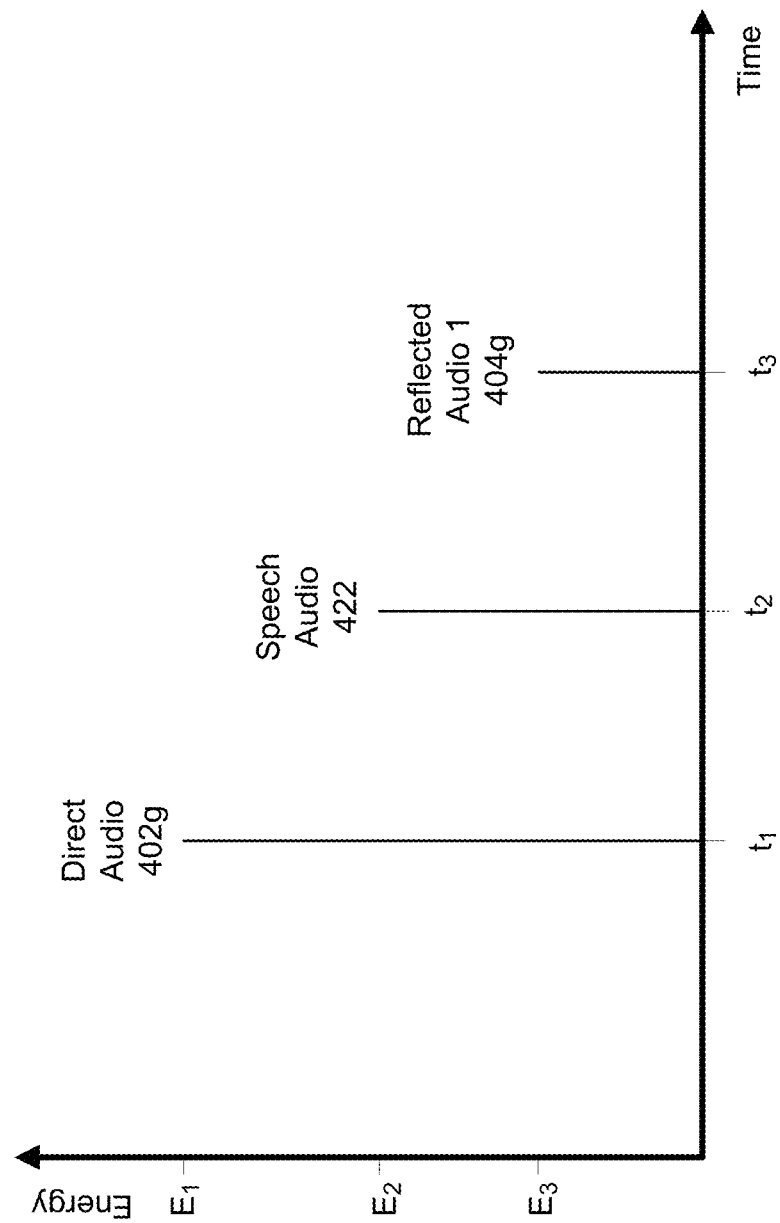

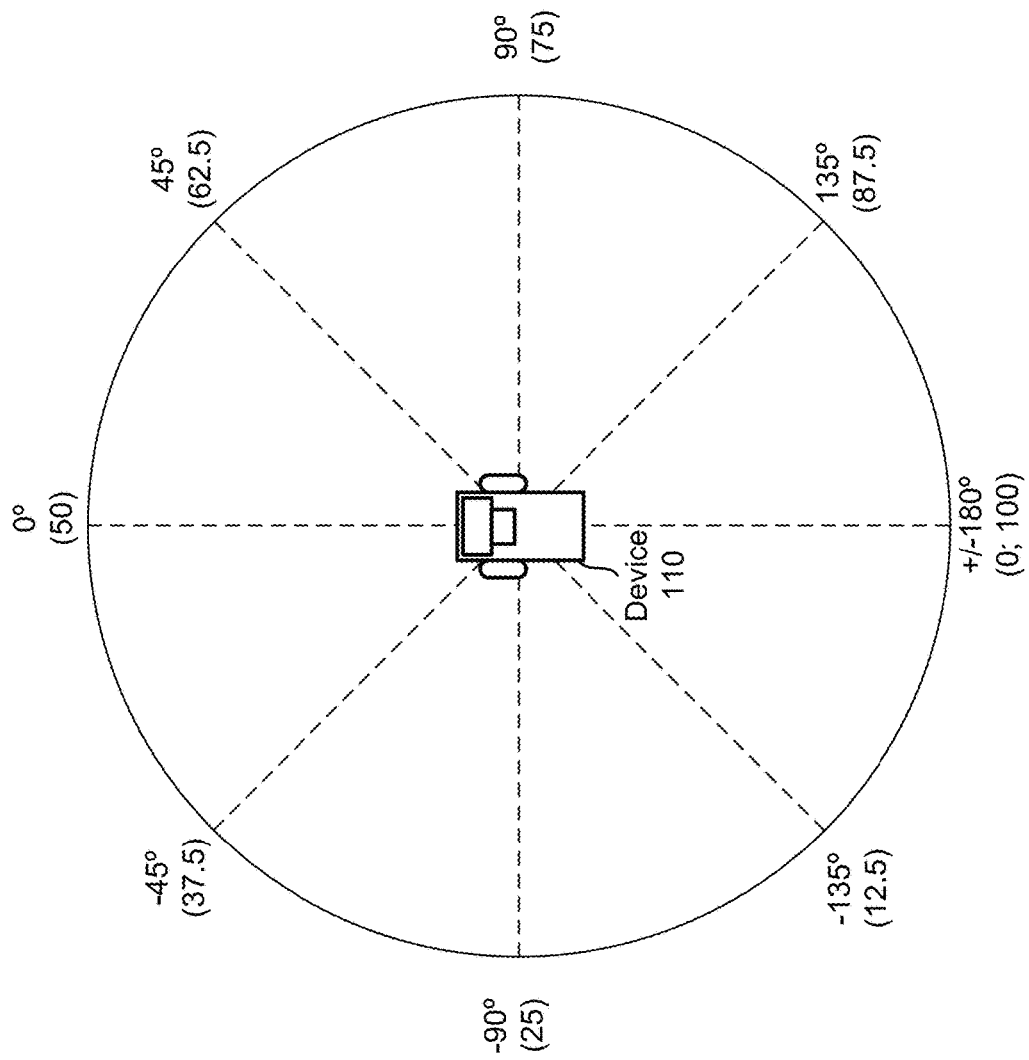

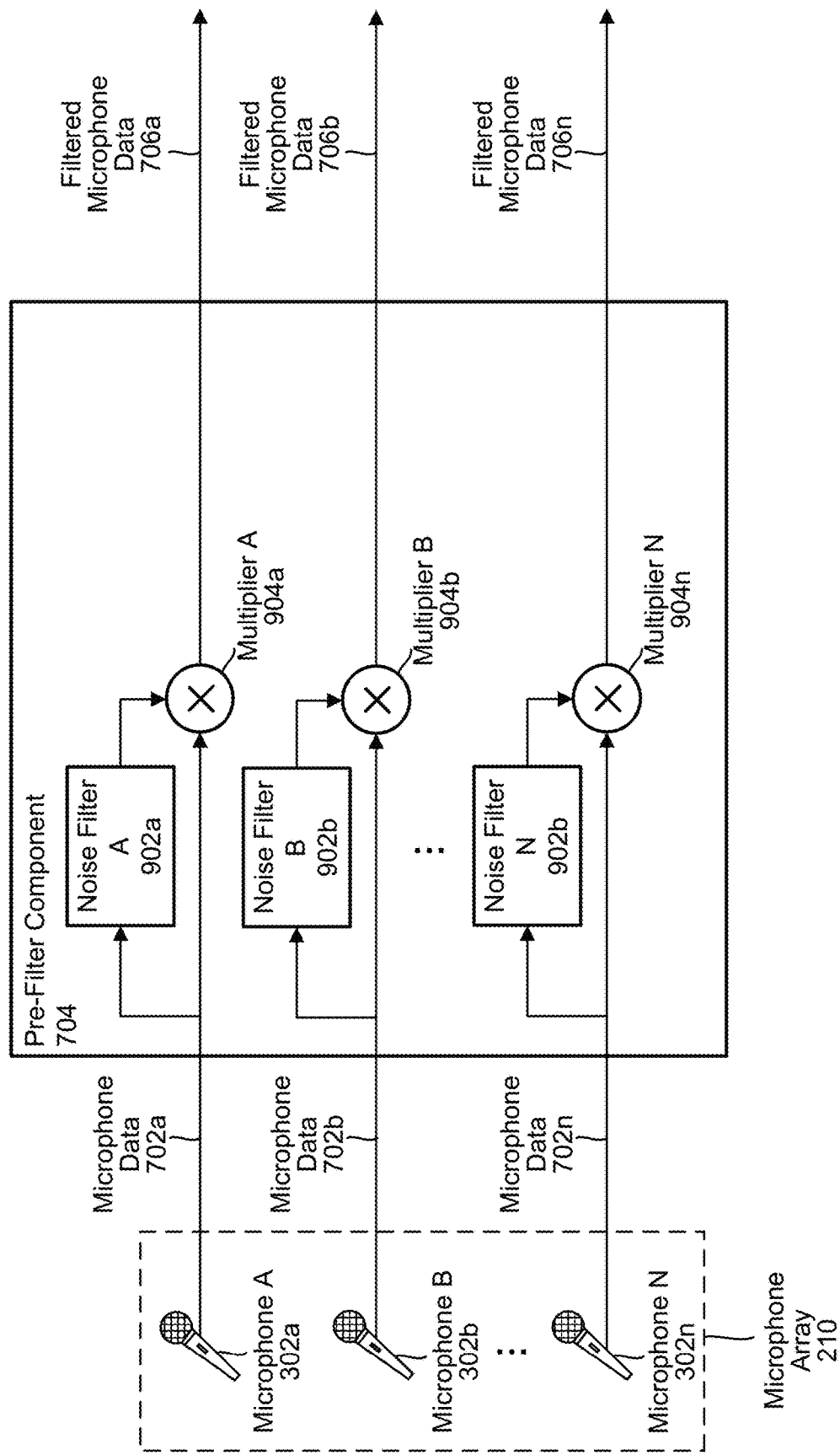

AUTONOMOUSLY MOTILE DEVICE WITH AUDIO REFLECTION DETECTION

BACKGROUND

A computing device may include a microphone array that includes two or more microphones for capturing audio, which may include speech, that is present in an environment of the device. Techniques such as beamforming may be used to process audio data from the two or more microphones to determine a direction relative to the device in which a source of audio, such as a human speaker, lies. The device may perform further actions based on the determined direction, such as activating a light indicating the direction or suppressing noise from other directions.

BRIEF DESCRIPTION OF DRAWINGS

For a more complete understanding of the present disclosure, reference is now made to the following description taken in conjunction with the accompanying drawings.

FIGS. 1A and 1B illustrate systems and methods for detecting audio reflections according to embodiments of the present disclosure.

FIGS. 2A, 2B, and 2C illustrate views of an autonomously motile device according to embodiments of the present disclosure.

FIGS. 2E and 2F illustrate images captured by an autonomously motile device in an environment according to embodiments of the present disclosure.

FIG. 3 illustrates a microphone array according to embodiments of the present disclosure.

FIGS. 4A-4H illustrate different situations in which an autonomously motile device may receive audio according to embodiments of the present disclosure.

FIG. 5 illustrates a coordinate system of an autonomously motile device according to embodiments of the present disclosure.

FIGS. 9A and 9B illustrate systems for filtering microphone data using an autonomously motile device according to embodiments of the present disclosure.

DETAILED DESCRIPTION

Figure 2B:
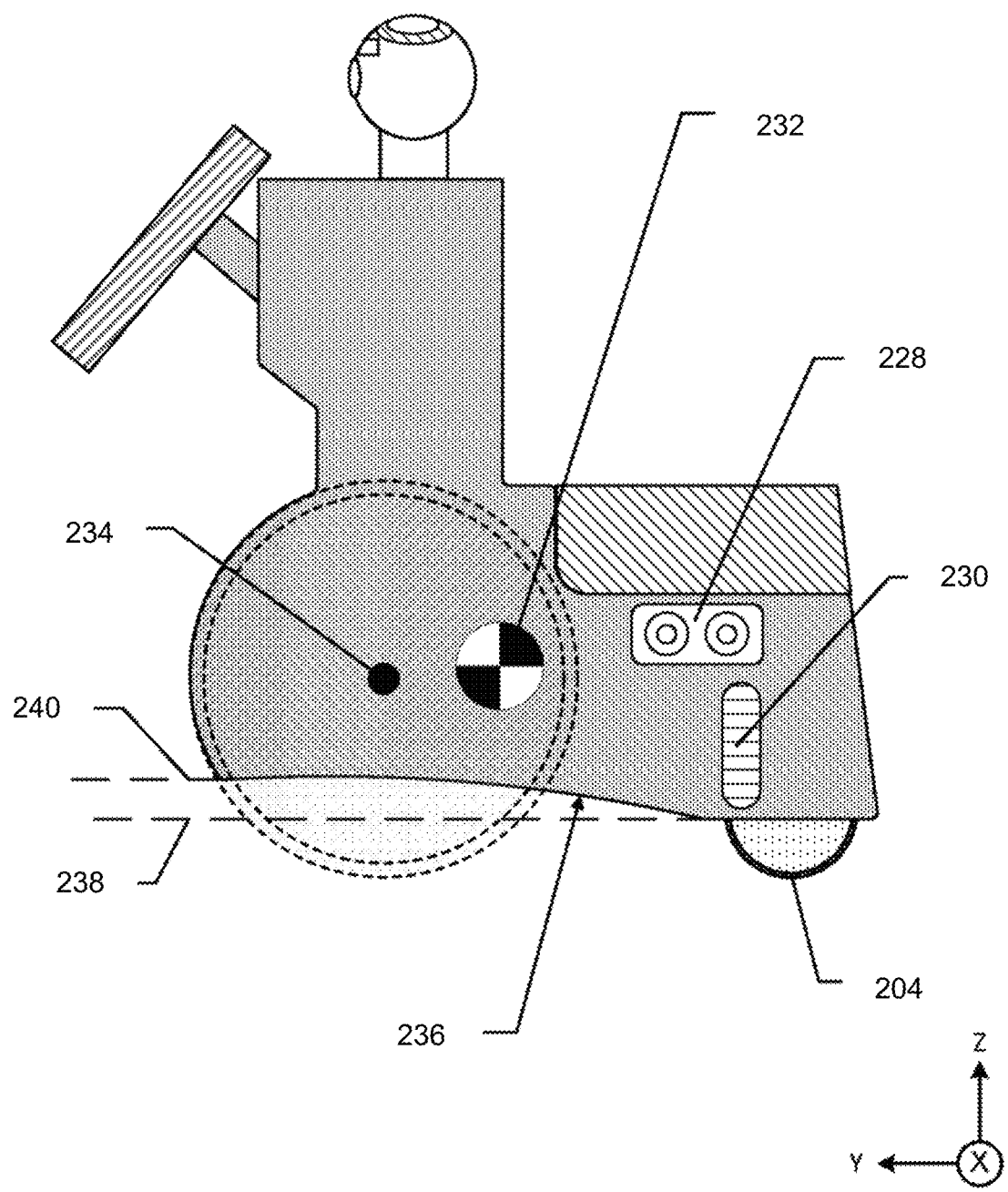

A device such as an autonomously motile device—e.g., a robot—may include, among other components, a microphone array that includes two or more microphones; each microphone may include a transducer that converts sound waves incident upon the transducer into a corresponding audio signal. Using beamforming techniques described herein, the device may process the signals received from each microphone to amplify audio received from a particular direction relative to the autonomously motile device—e.g., a direction in which a user lies—and suppress audio from other directions.

Upon determining a direction corresponding to a user or other speaker of an utterance and/or other audio event, the device may determine an output corresponding to the direction and perform one or more additional actions associated with the output. For example, the device may include a plurality of lights that each indicate a particular direction relative to the device; device may determine an output associated with illuminating one of the lights that corresponds to the direction of the user. The illuminated light may indicate to the user (and/or other people proximate the device) the direction in which the autonomously motile device is "listening."

In some embodiments, an autonomously motile device instead or in addition determines an output corresponding to movement in its environment in response to determining the direction of the user. For example, the autonomously motile device may move one or more of its component(s), such as a display screen and/or a camera, to face the determined direction of the user, speaker, and/or event. The autonomously motile device may instead or in addition rotate in place to face the determined direction of the user. The autonomously motile device may further, instead or in addition, move in a direction in the environment in response to determining the direction of the user; this movement may include moving toward the user, moving away from the user, and/or moving perpendicularly with respect to the user. The autonomously motile device may be capable of performing only a first subset of these types of motion and may be incapable of performing a second subset of these types of motion. For example, the autonomously motile device may move a display of the device to face the direction of the user but may be incapable of moving in the environment toward the user.

The microphone array of the device may, however, receive both audio from the user as well as one or more reflections of the audio; the audio from the user may, for example, reach a reflective surface in the environment, reflect from the surface, and then be detected by the microphone array of the autonomously motile device. If the device does not recognize this audio as a reflection, it may attempt to move in a direction corresponding to the source of the reflection, which may not be the direction corresponding to the user.

The device may also perform beamforming. In audio systems, beamforming refers to techniques that are used to isolate audio from one or more particular directions. Beamforming may be particularly useful when filtering out noise from non-desired directions. Beamforming may be used for various tasks, including isolating voice commands to be executed by a speech-processing system. A fixed beamformer component may isolate audio from particular directions by applying one or more filters, each having different filter coefficients, to exploit variations in the time each microphone in the array receives audio from each direction. An adaptive beamformer may remove noise by identifying a direction in which a noise source lies and removing that noise from desired audio. A beam-selection component selects at least one beam from a plurality of beams corresponding to a desired direction, such as a direction toward which a user is disposed.

Embodiments of the present disclosure thus describe receiving audio using a microphone array of a device such as an autonomously motile device, identifying sources of audio based thereon, and identifying which of the sources correspond to users (or other speakers of utterances and/or other audio events) and which of the sources correspond to reflections. Audio data corresponding to sources of users may be further processed by, for example, a speech-to-text and/or natural-language understanding system. The direction of the user may be used to cause the device to illuminate a light indicating the direction of the user and/or cause the autonomously motile device to move, e.g., toward the user. The sources that correspond to reflections may be discarded and/or not selected for further processing.

FIG. 1A illustrates a system that includes an autonomously motile device 110a, which is described in greater detail below. In various embodiments, the autonomously motile device 110a is capable of autonomous motion using one or motors powering one or more wheels, treads, robotic limbs, or similar actuators. The autonomously motile device 110a may further be capable of three-dimensional motion (e.g., flight) using one or more rotors, wings, jets, electromagnetic field generators, or similar actuators. The motion may be linear motion and/or angular motion. The present disclosure is not limited to particular method of autonomous movement/motion. The device 110a may, for example, follow a user 102a around a room to thereby allow the user 102a easier access to features of the device 110a, such as its voice interface. The user 102 may utter a command, represented by speech audio 109a, that is received by the device 110a. The speech audio 109a may reflect from one or more reflective surfaces 108a; the reflection 106a may also be received by the device 110a.

The device 110a may further include one or more display screens for displaying information to a user 102a and/or receiving touch input from a user. The device 110a may further include a microphone array including one or more microphones and one or more loudspeakers; the microphone array and loudspeakers may be used to receive audio data, such as an utterance, from the user 102a. The utterance may be, for example, a command or request. The device 110a may also be used to output audio to the user 102, such as audio related to a command or audio related to a request.

The device 110a may further include one or more sensors, as explained in greater detail below with respect to FIG. 11D. These sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110a may be, in some embodiments, a robotic assistant or "robot" that may move about a room or rooms to provide a user with requested information or services. In other embodiments, the device 110a is capable of rotation but not linear motion; the device 110a may be mounted or placed on a surface or floor, for example, and may rotate in place to face a user 102a. The disclosure is not, however, limited to only these devices or components, and the device 110a may include additional components without departing from the disclosure.

In various embodiments, with reference to FIG. 1, the autonomously motile device 110a receives (120), from a microphone array, audio data. As described herein, the microphone array may include at least two microphones, and the audio data may include first audio data from a first microphone and second audio data from a second microphone. The device 110a determines (122) that the audio data includes a first representation of first audio corresponding to a first direction relative to the autonomously motile device and determines (124) that the audio data includes a second representation of second audio corresponding to a second direction relative to the autonomously motile device. As described herein, the device 110a may make these determinations by processing the audio data to determine its power magnitude as a function of direction relative to the device and time (divided into, e.g., 10 millisecond frames of audio data). The device 110a determines (126) that the second audio represents a reflection of the first audio. As explained herein, the device 110 may compare arrival times of the first and second audio, power spectrums of the first and second audio, and/or movement of the first and second audio. The device 110a causes (128) movement corresponding to the first direction.

In various embodiments, with reference to FIG. 1A, a device 110b (which may be the autonomously motile device or other device) receives (130), from a microphone array, audio data. The device 110b determines (132) that the audio data includes a first representation of first audio corresponding to a first direction relative to the device 110b and determines (124) that the audio data includes a second representation of second audio corresponding to a second direction relative to the device 110b. As described herein, the device 110b may make these determinations by processing the audio data to determine its power magnitude as a function of direction relative to the device and time (divided into, e.g., 10 millisecond frames of audio data). The device 110b determines (136) that the second audio represents a reflection of the first audio. As explained herein, the device 110b may compare arrival times of the first and second audio, power spectrums of the first and second audio, and/or movement of the first and second audio. The device 110b determines (138) an output corresponding to the direction; this output may be associated with movement of the device 110b and/or illumination of one or more lights of the device 110b.

FIG. 2A illustrates a front view of the autonomously motile device 110 according to various embodiments of the present disclosure. The device 110 includes wheels 202 that are disposed on left and right sides of the device 110. The wheels 202 may be canted inwards toward an upper structure of the device 110. In other embodiments, however, the wheels 202 may be mounted vertically (e.g., not canted). A caster 204 (e.g., a smaller wheel) may disposed along a midline of the device 110. The front section of the device 110 may include a variety of external sensors. A first set of optical sensors 206, for example, may be disposed along the lower portion of the front of the device 110, and a second set of optical sensors 208 may be disposed along an upper portion of the front of the device 110. A microphone array 210 may be disposed on a top surface of the device 110; the microphone array 210 may, however, be disposed on any surface of the device 110.

One or more cameras 212 may be mounted to the front of the device 110; two cameras 212, for example, may be used to provide for stereo vision. The distance between the two cameras 212 may be, for example, 5-15 centimeters; in some embodiments, the distance is 10 centimeters. In some embodiments, the cameras 212 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may provide for the device 110 to more easily detect objects when rotating or turning.

The cameras 212, which may be used for navigation, may be of different resolution from, or sensitive to different wavelengths than, other cameras used for other purposes, such as video communication. For example, the navigation cameras 212 may be sensitive to infrared light allowing the device 110 to operate in darkness or semi-darkness, while a camera 216 mounted above a display 214 may be sensitive to visible light and may be used to generate images suitable for viewing by a person. A navigation camera 212 may have a resolution of at least 300 kilopixels each, while the camera 216 mounted above the display 214 may have a resolution of at least 10 megapixels. In other implementations, navigation may utilize a single camera.

The cameras 212 may operate to provide stereo images of the environment, the user, or other objects. For example, an image from the camera 216 disposed above the display 214 may be accessed and used to generate stereo-image data corresponding to a face of a user. This stereo-image data may then be used for facial recognition, user identification, gesture recognition, gaze tracking, and other uses. In some implementations, a single camera 216 may be disposed above the display 214.

The display 214 may be mounted on a movable mount. The movable mount may allow the display to move along one or more degrees of freedom. For example, the display 214 may tilt, pan, change elevation, and/or rotate. In some embodiments, the display 214 may be approximately 20 centimeters as measured diagonally from one corner to another. An ultrasonic sensor 218 may be mounted on the front of the device 110 and may be used to provide sensor data that is indicative of objects in front of the device 110.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 224, 226 may be disposed on the underside of the device 110. The floor optical-motion sensors 224, 226 may provide indication indicative of motion of the device 110 relative to the floor or other surface underneath the device 110. In some embodiments, the floor optical-motion sensors 224, 226 comprise a light source, such as light-emitting diode (LED) and/or an array of photodiodes. In some implementations, the floor optical-motion sensors 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 224, 226 may provide other information, such as data indicative of a pattern present on the floor, composition of the floor, color of the floor, and so forth. For example, the floor optical-motion sensors 224, 226 may utilize an optoelectronic sensor that may detect different colors or shades of gray, and this data may be used to generate floor characterization data.

FIG. 2B illustrates a side view of the device 110 according to various embodiments of the present disclosure. In this side view, the left side of the device 110 is illustrated. An ultrasonic sensor 228 and an optical sensor 230 may be disposed on either side of the device 110.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster 204 is shown in a trailing configuration, in which the caster 204 is located behind or aft of the wheel axle 234 and the center of gravity 232. In another implementation (not shown) the caster 204 may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

Figure 2C:
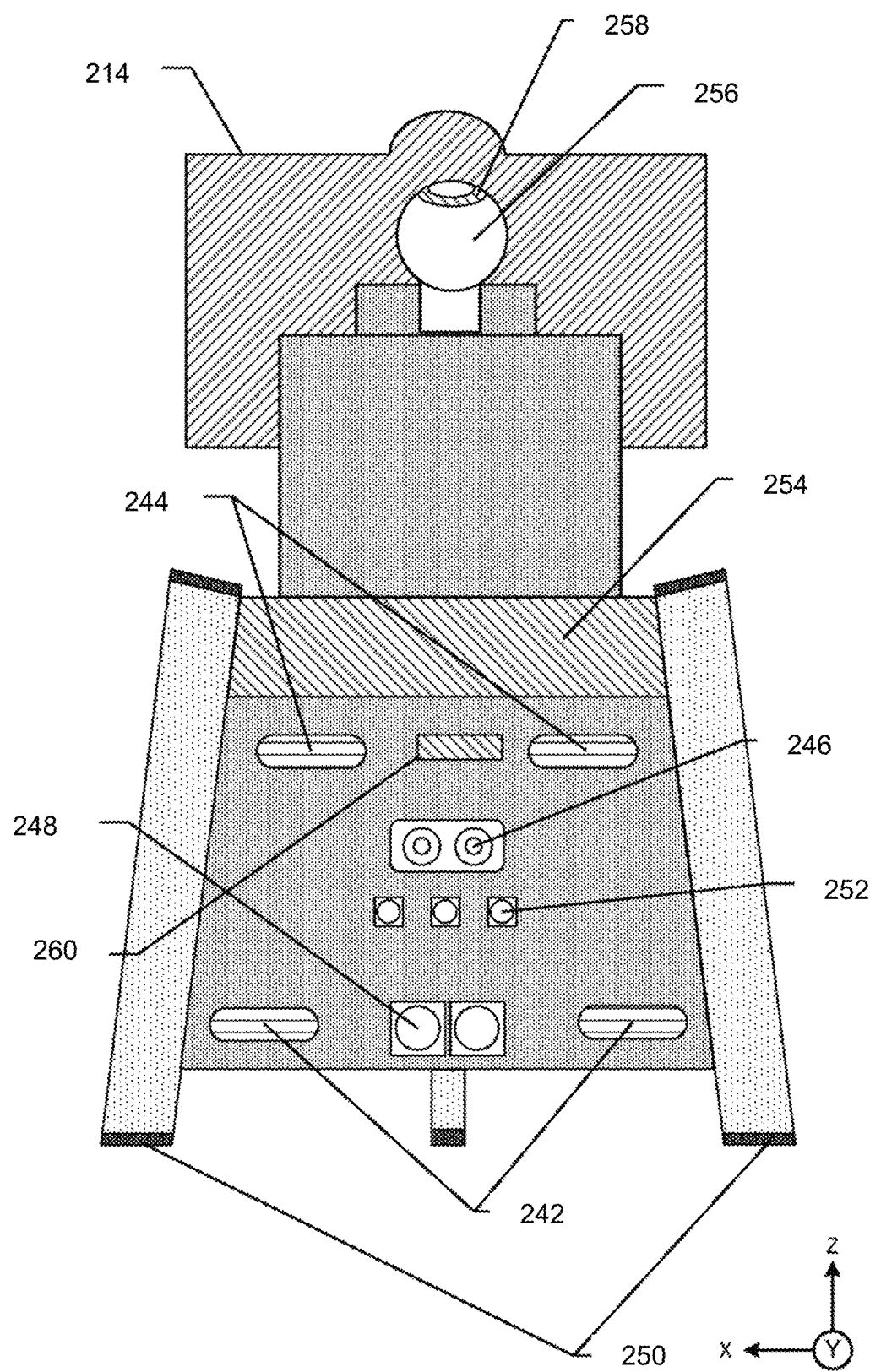

FIG. 2C illustrates a rear view of the device 110 according to various embodiments of the present disclosure. In this view, as with the front view, a first pair of optical sensors 242 may be located along the lower edge of the rear of the device 110, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within the lower structure. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 256, which may include a light 258.

Figure 2D:
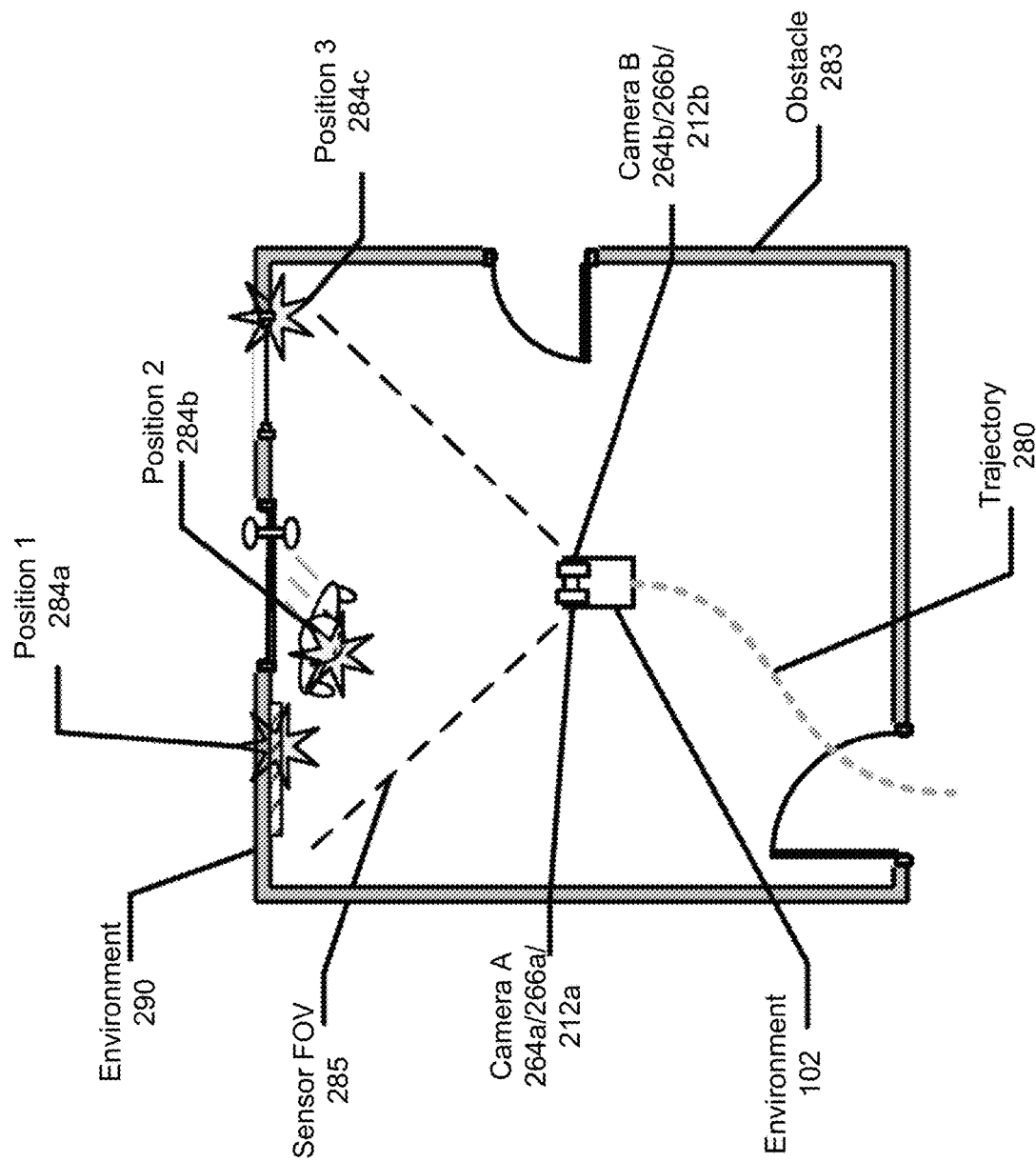
FIG. 2D illustrates a view of an autonomously motile device in an environment according to embodiments of the present disclosure.

As shown in FIG. 2D, the autonomously motile device 110 may move in the environment 290. The motion of the autonomously motile device 110 may be described as a trajectory 280, as shown in FIG. 2D. In some implementations, the trajectory 280 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

One or more motors or other actuators enable the autonomously motile device 110 to move from one location in the environment 290 to another. For example, a motor may be used to drive a wheel attached to a chassis of the autonomously motile device 110, which causes the autonomously motile device 110 to move. The autonomously motile device 110 may turn, move forward, move backward, and so forth. In another example, actuators may move legs allowing the autonomously motile device 110 to walk.

Figure 11A:
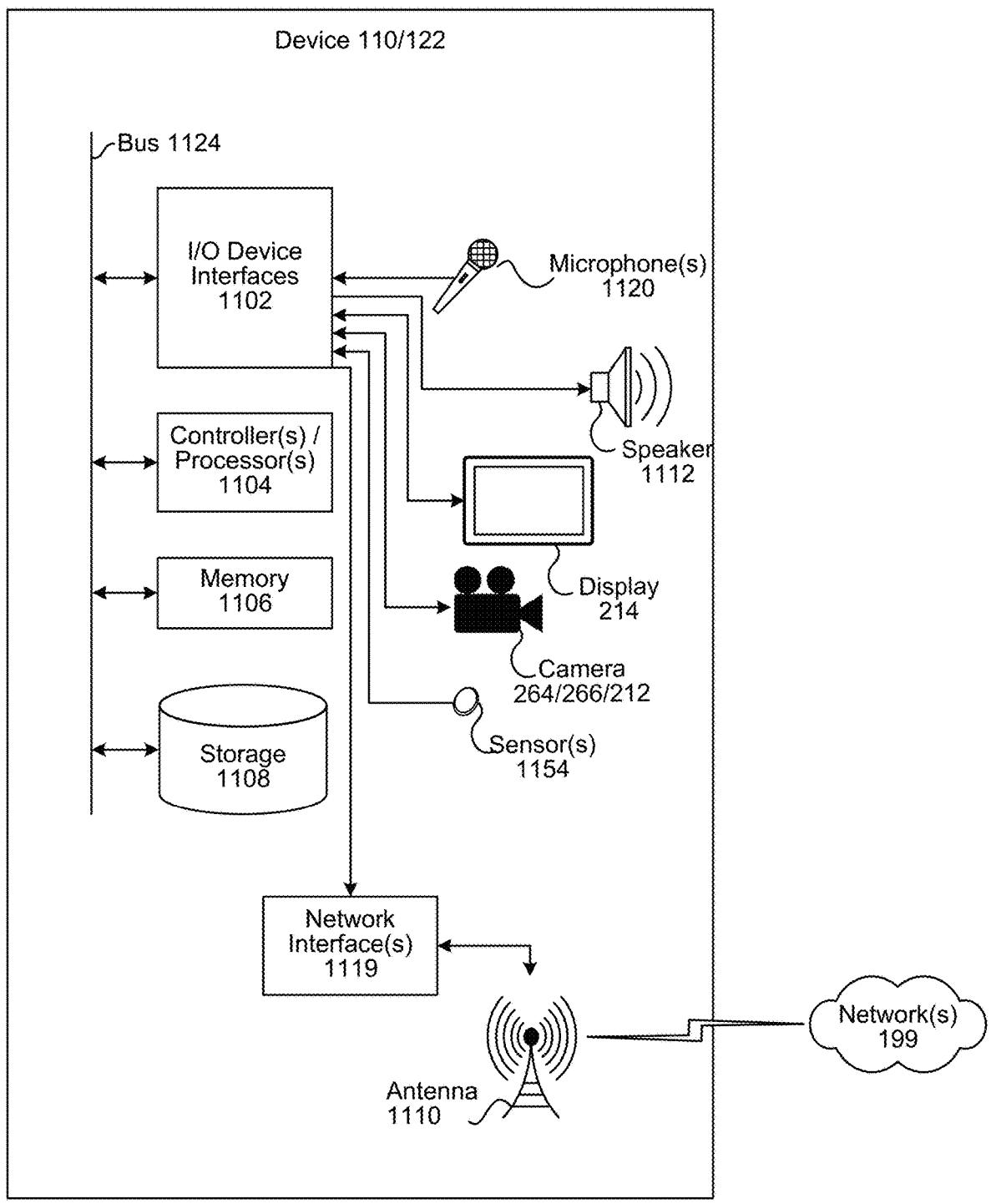
FIG. 11A illustrates a block diagram of an autonomously motile device according to embodiments of the present disclosure.

The autonomously motile device 110 may include one or more sensors 1154 (shown below in FIG. 11D). For example, the sensors 1154 may include a first camera 264a/266a/212a, a second camera 264b/266b/212b, an inertial measurement unit (IMU) 1180, microphones, time-of-flight sensors, and so forth. The first camera 264a/266a/212a and the second camera 264b/266b/212b may be mounted to a common rigid structure that maintains a relative distance between the cameras 264/266/212. An IMU 1180 may be attached to this common rigid structure, or one of the cameras affixed thereto. The first camera 264a/266a/212a and the second camera 264b/266b/212b may be arranged such that a sensor field-of-view 285 of the first camera 264a/266a/212a overlaps at least in part a sensor field-of-view of the second camera 264b/266b/212b. The sensors 1154 may generate sensor data 1147 (which may be stored in storage 1108 as illustrated in FIG. 11C discussed below). The sensor data 1147 may include image data 1142 acquired by the first camera 264a/266a/212a and the second camera 264b/266b/212b. For example, as shown in FIG. 2E, a pair of images 282 may comprise image data 1142 from the first camera 264a/266a/212a and the second camera 264b/266b/212b that are acquired at the same time. For example, a first pair of images 282a are acquired at time $t_1$ and a second pair of images 282b are acquired at time $t_2$. The sensors 1154 are discussed in more detail with regard to FIG. 11D.

During operation the autonomously motile device 110 may determine input data. The input data may include or be based at least in part on sensor data 1147 from the sensors 1154 onboard the autonomously motile device 110. In one implementation, a speech processing component 1137 may process raw audio data obtained by a microphone on the autonomously motile device 110 and produce input data. For example, the user may say "robot, come here" which may produce input data "come here". In another implementation, the input data may comprise information such as a command provided by another computing device, such as a smartphone or tablet computer.

Figure 11B:
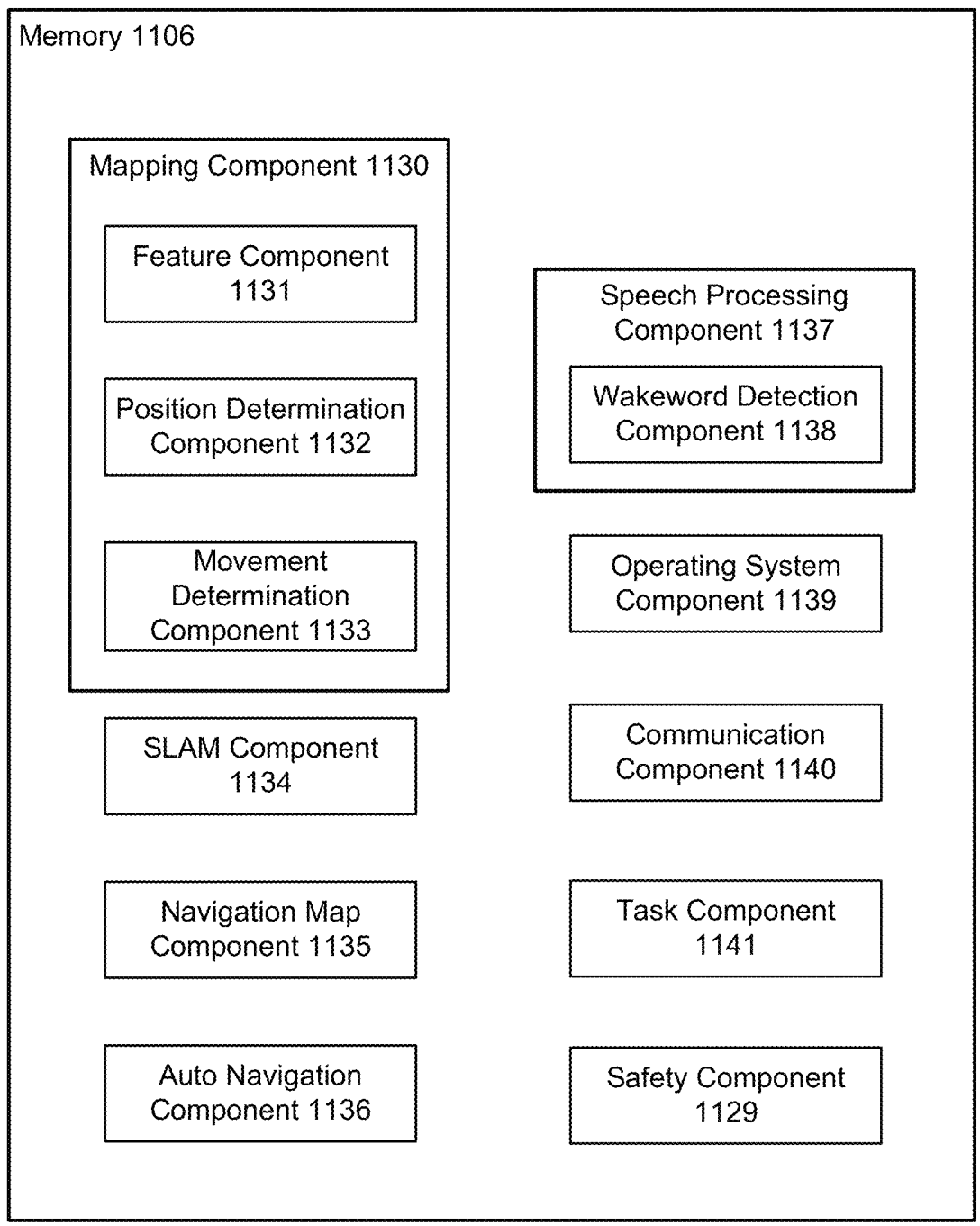
FIG. 11B illustrates components that may be stored in a memory of an autonomously motile device according to embodiments of the present disclosure.
Figure 11C:
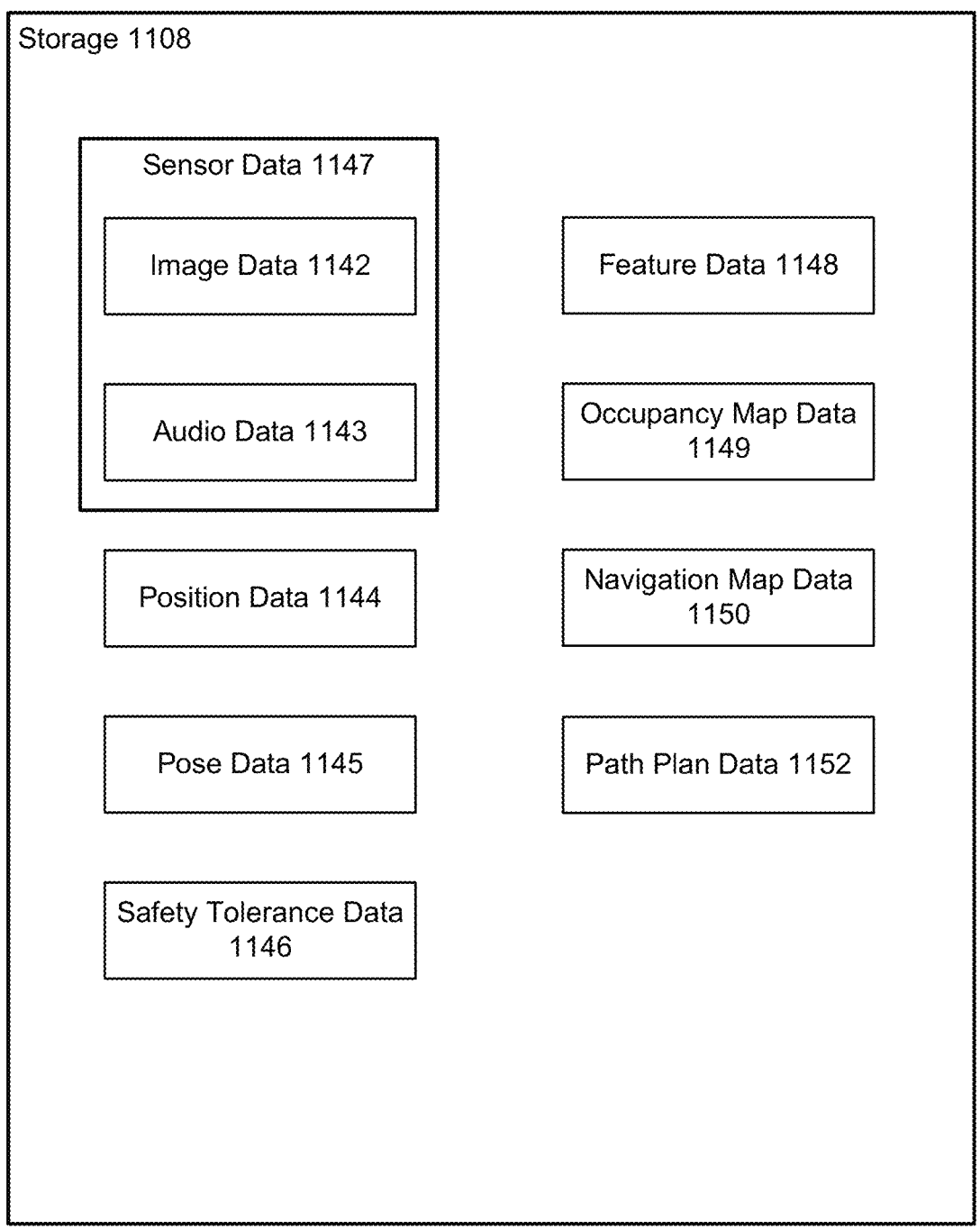
FIG. 11C illustrates data that may be stored in a storage of an autonomously motile device according to embodiments of the present disclosure.

A mapping component 1130 (which may be included in memory 1106 as illustrated in FIG. 11B and as further discussed below) determines a representation of the environment 290 that includes the obstacles 283 and their location in the environment 290. During operation the mapping component 1130 uses the sensor data 1147 from various sensors 1154 to determine information such as where the autonomously motile device 110 is, how far the autonomously motile device 110 has moved, the presence of obstacles 283, where those obstacles 283 are, and so forth.

A feature component 1131 processes at least a portion of the image data 1142 to determine first feature data 1148. The first feature data 1148 is indicative of one or more features 286 that are depicted in the image data 1142. For example, as shown in FIG. 2F, the features 286 may be edges of doors, shadows on the wall, texture on the walls, portions of artwork in the environment 290, and so forth. The environment 290 may include display devices that are capable of changing the images they portray. For example, a television 288 may be presented in the environment 290. The picture presented by the television 288 may also have features 286.

Various techniques may be used to determine the presence of features 286 in image data 1142. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 286 in the image data 1142. A feature 286 that has been detected may have an associated descriptor that characterizes that feature 286. The descriptor may comprise a vector value in some implementations. For example, the descriptor may comprise data indicative of the feature with respect to 256 different dimensions.

The first feature data 1148 may comprise information such the descriptor for the feature 286, the images that the feature 286 was detected in, location in the image data 1142 of the feature 286, and so forth. For example, the first feature data 1148 may indicate that in a first image the feature 286 is centered at row 994, column 312 in the first image. These data and operations, along with those discussed below, may be used by the autonomously motile device 110, and/or other devices, to perform the operations described herein.

FIG. 3 illustrates further details of the microphone array 210. In some embodiments, the microphone array 210 includes eight microphones 302a, 302b, 302c, 302d, 302e, 302f, 302g, and 302h, arranged in two concentric circles; the four microphones of one circle may be rotated 45 degrees with respect to the four microphones of the other circle. The present disclosure is not, however, limited to any particular number or arrangement of microphones.

The microphone array 210 may include various numbers of individual microphones. The individual microphones may capture sound and pass the resulting audio signals created by the sound to downstream components, such as a directional power magnitude component, as discussed below. Each individual piece of audio data captured by a microphone may be represented as a time-domain audio signal; these signals may be converted to the frequency domain using an analysis filterbank, which may perform a Fourier transform.

To isolate audio from a particular direction, as discussed herein, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

Figure 4B:
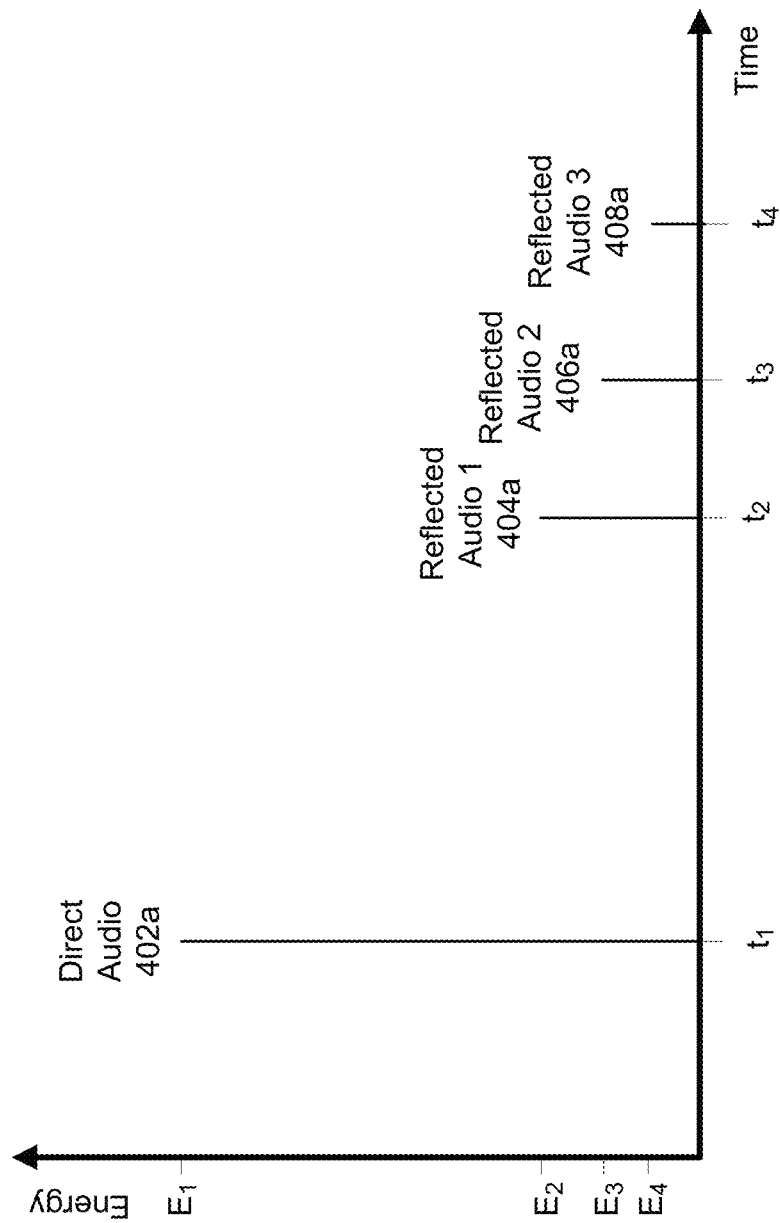

FIGS. 4A-4H illustrate different situations in which an autonomously motile device in an environment may receive audio according to embodiments of the present disclosure. Referring first to FIG. 4A, the autonomously motile device 110 may be disposed in an environment 290 (e.g., a physical space such as a room) such that a distance between the device 110 and a wall of the environment 290 and/or other reflective surface 108 is greater than a minimum distance, such as 2 or 3 meters. In other words, the device 110 may be disposed approximately in the middle of the room of the environment 290.

A user 102 may speak an utterance, such as command; audio corresponding to the utterance may be received by the device 110 and, as described in greater detail herein, processed to determine audio data that includes a representation of the utterance. This audio may be received as direct audio 402a; that is, the audio may travel in a straight line between the user 102 and the device 110.

The device 110 may also receive reflected audio; the reflected audio may be created when audio corresponding to the utterance (and/or other audio) reflects off a wall of the environment 290 and/or other reflective surface 108 of the environment 290. For example, the device 110 may receive first reflected audio 404a from a reflection of a first wall of the environment 290, second reflected audio 406a from a reflection from a reflective surface 108, and/or third reflected audio 408a from a reflection from a second wall of the environment 290.

Referring to FIG. 4B, the reflected audio 404a, 406a, 408a may arrive at the device 110 at times $t_2$, $t_3$, $t_4$, which may occur after a time $t_1$ of the arrival of the direct audio 402a. The reflected audio 404a, 406a, 408a may travel a greater distance to reach the device 110 and may thus take more time to cross this distance than does the direct audio 402a, thus causing the later arrival times of the reflected audio 404a, 406a, 408a. The speed of sound may be, for example, approximately 340 meters per second; if the user 102 is disposed in the environment 290 approximately five meters from the device 110, the audio corresponding to the utterance of the user may take approximately fifteen milliseconds to reach the device 110 as direct audio 402a. In contrast, the reflected audio 404a, 406a, 408a may travel ten or more meters to reach the wall and/or reflective surface 108 and then travel to the device 110; this travel time of the reflected audio 404a, 406a, 408a may thus be greater than that of the direct audio 402a. The travel time of the reflected audio 404a, 406a, 408a may be, for example, approximately 30 milliseconds.

The energy levels $E_2$, $E_3$, $E_4$ of the reflected audio 404a, 406a, 408a may similarly differ from the energy level $E_1$ of the direct audio 402a. The energy levels $E_2$, $E_3$, $E_4$ of the reflected audio 404a, 406a, 408a may be less than the energy level $E_1$ of the direct audio 402a due to energy loss associated with the greater travel distance of the reflected audio 404a, 406a, 408a and/or energy loss associated with the reflection (e.g., energy lost to the wall and/or reflective surface 108). As described in greater detail herein, the device 110 may distinguish the direct audio 402a from the reflected audio 404a, 406a, 408a based on the difference in the arrival times and/or energy levels.

Referring to FIG. 4C, the device 110 may be disposed proximate one or more walls (or other reflective surfaces 108) of the environment 290. The distance between the device 110 and the one or more walls may be, for example, one meter or less. As illustrated in FIG. 4C, the device 110 receives direct audio 402 from a user 102 as well as first reflected audio 404c reflected from a first wall and second reflected audio data 406 reflected from a second wall.

Figure 4D:
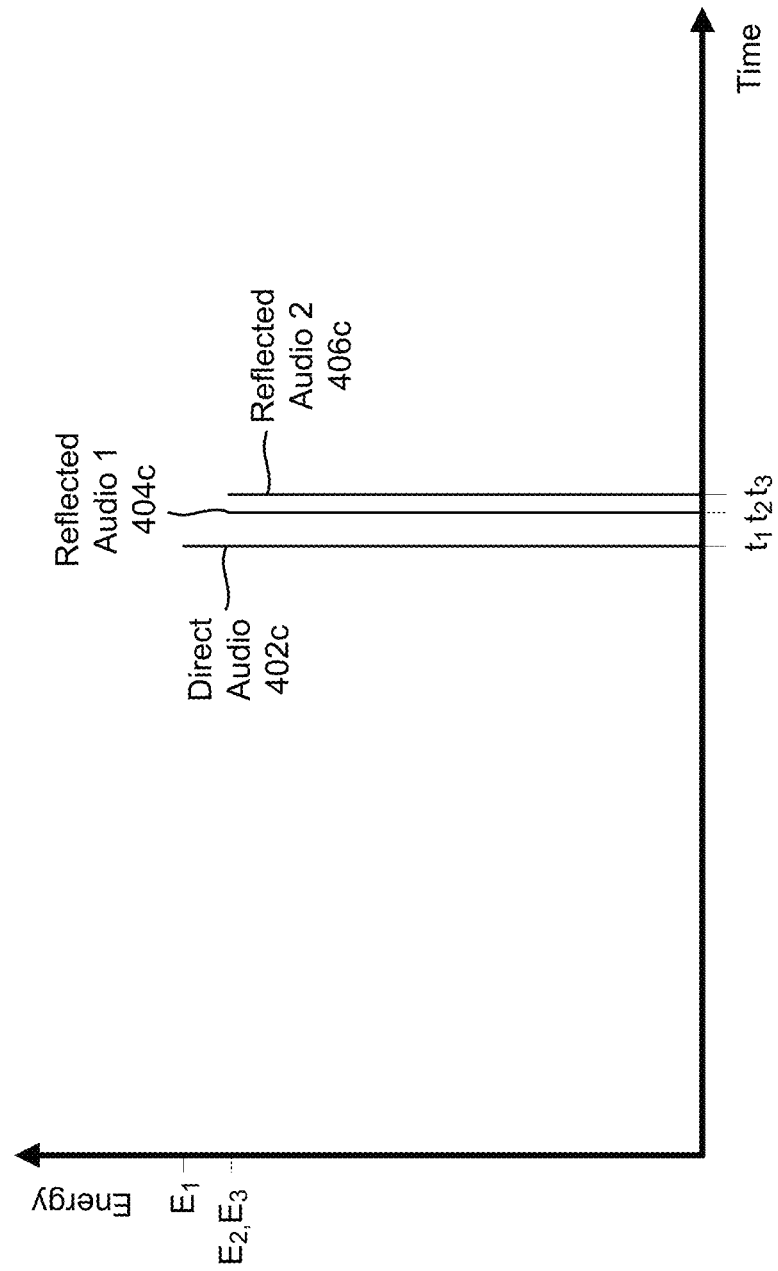

Referring to FIG. 4D, the energy levels $E_2$, $E_3$ of the reflected audio 404c, 406c, while less than the energy level $E_1$ of the direct audio 402c, may be closer in magnitude (e.g., only approximately 5% less) to that of the direct audio 402 (as compared to, for example, the energy levels $E_2$, $E_3$, $E_4$ of the reflected audio 404a, 406a, 408a of FIG. 4B). The energy levels may be similar in magnitude because the direct audio 402c and the reflected audio 404c, 406c may travel approximately equal distances between the user 102 and the device 110. The reflected audio 404c, 406c, because it may have traveled a distance similar to that of the direct audio 402c, arrive at the device at times $t_2$, $t_3$, which may differ from the time $t_1$ of arrival of the direct audio 402c by less than only a few milliseconds.

Referring to FIG. 4E, in some embodiments, direct audio 402e received by a device 110 may have a lower energy level than that of later-received reflected audio 404e. For example, the direct audio 402e may pass through an object 410, such as an item of furniture, wall, person, or other such object, which may absorb some energy of the direct audio 402e and thus lower its energy level $E_1$. The reflected audio 404e may not pass through the object 410 and may thus not lose any energy to it. FIG. 4F illustrates that the energy level $E_1$ of the direct audio 402e may be less than that of the energy level $E_2$ of the reflected audio 404e.

FIG. 4G illustrates an environment 290 that includes a speaker 420 in addition to the user 102. The environment 290 may also or instead include one or more other sources of audio, such as events like a dog barking, a window breaking, or a door knock. As described above, the device 110 receives direct audio 402g from the user 102 as well as reflected audio 404g that has reflected from at least one surface in the environment 290. Also as shown in FIG. 4G, however, the device 110 receives speech audio 422 from the speaker 420. As shown in FIG. 4H, the speech audio 422 may resemble a reflection of the direct audio 402g. The device 110 may, as descried in greater detail below, distinguish the speech audio 422 from reflected audio 404g by determining one or more properties of the speech audio 422, such as its frequency and/or power spectrum, and comparing them to similarly determined properties of the direct audio 402g.

FIG. 5 illustrates a top view of the device 110 and a coordinate system surrounding the device 110. In various embodiments, the coordinate system is divided into 360 degrees, wherein each degree denotes a particular direction with respect to the device 110. 0° may, for example, denote a direction directly in front of the device 110, while ±180° may denote a direction directly behind the device 110. Instead or in addition, the coordinate system may be divided into different numbers of sections; in some embodiments, the coordinate system is divided into 100 sections, wherein a value of 50 denotes a direction directly in front of the device 110 and values of 0 or 100 denote a direction directly behind the device 110.

Figure 6A:
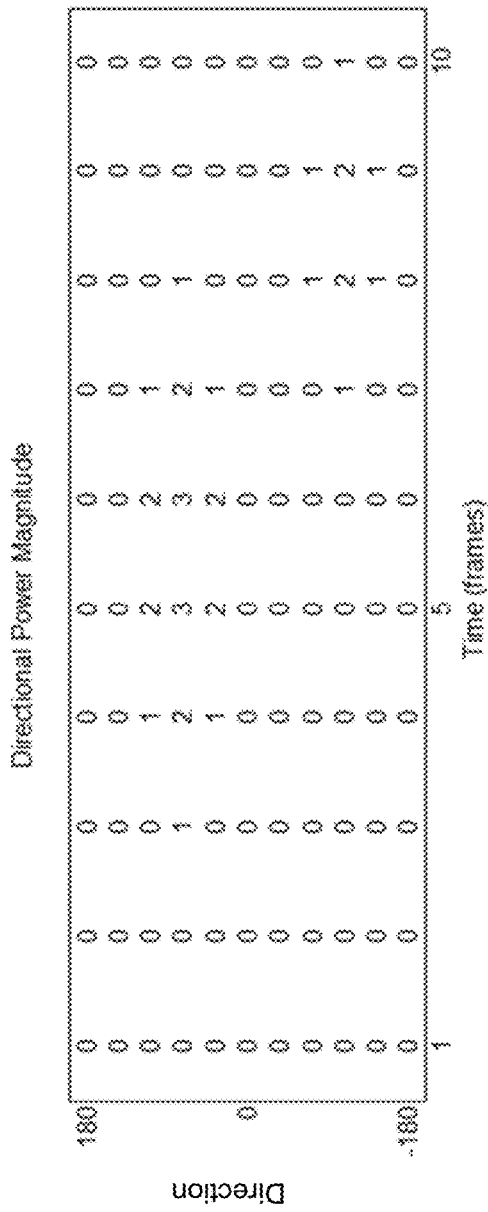
FIGS. 6A-6D illustrate audio data processed by an autonomously motile device according to embodiments of the present disclosure.

FIGS. 6A-6D illustrate processed audio data in accordance with embodiments of the present disclosure. Referring first to FIG. 6A, a directional power-determination component (described in greater detail below) may process audio data received from two or more microphones 302 of a microphone array 210 to determine directional power magnitude data. For each time unit, which may be frames of audio data each corresponding to approximately 10 milliseconds of audio data, the directional power-determination component may determine magnitude data corresponding to audio received by from each microphone. A microphone closer to a source of audio data, such as a user 102 speaking an utterance, may capture audio data having earlier than audio data captured by a second microphone farther from the source of audio data. The directional power-determination component may determine one or more delays in receipt of audio by determining a cross-correlation between the magnitude data from one or more microphones. The cross-correlation may be, for example, generalized cross-correlation (GCC) and may include determining a Fourier transform of the data from each microphone and determining a cross-power spectral density of the Fourier-transformed data.

The directional power magnitude data may include values of zero (or approximately zero) for directions in which no or little audio is received and non-zero values for directions in which some audio is received. The value of each entry of the directional power magnitude data may denote an amount of power received. While FIG. 6A illustrates that the directional power magnitude data may be divided into eleven directions (evenly spaced from −180° to 180°), any number of divisions of the coordinate system is within the scope of the present disclosure. The directional power magnitude data further illustrates the directional power magnitude using integers; the magnitude of the directional power may, however, be represented by any numbers, such as floating-point numbers. The directional power-determination component may determine directional audio data corresponding to each microphone; the directional power-determination component may instead or in addition interpolate between audio data received from multiple microphones to create additional directional audio data.

Figure 6B:
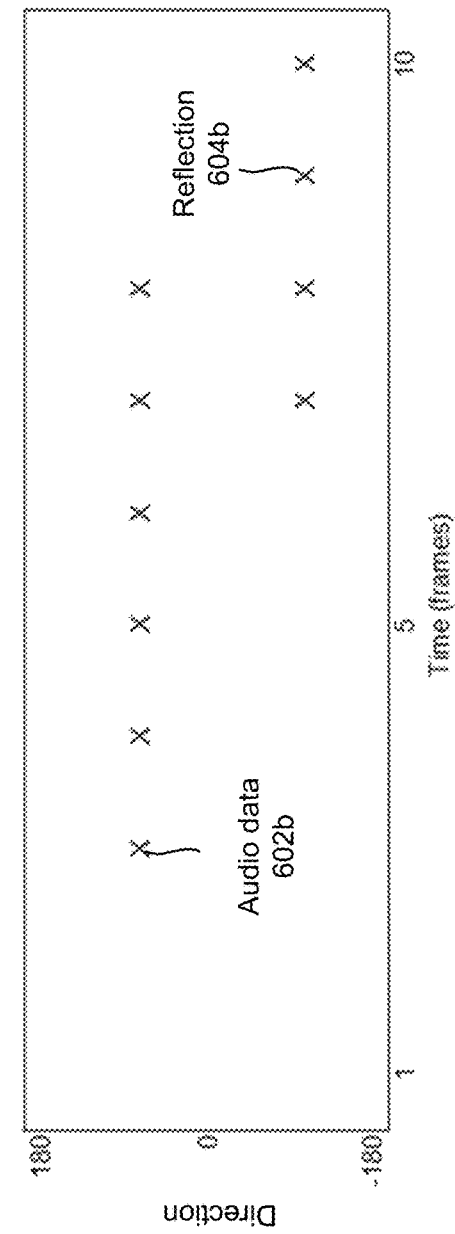

FIG. 6B illustrates estimated direction of arrival (DoA) data, which may be determined by a DoA estimation component (as described in greater detail below). The DoA estimation component may process the directional power magnitude data to determine, per time unit, one or more local power maxima. Each power maximum may correspond to either a source of audio data in a particular direction, such as a user 102 speaking an utterance, or a reflection of audio corresponding to the audio data. FIG. 6B illustrates first audio data 602b corresponding to the utterance and a reflection 604b of audio corresponding to the audio data. The reflection 604b may be caused by a reflective surface 108 that is separated from the device 110 by a distance, such as ten meters, and as such appears later in time and with lesser magnitude than the audio data 602b.

Figure 6C:
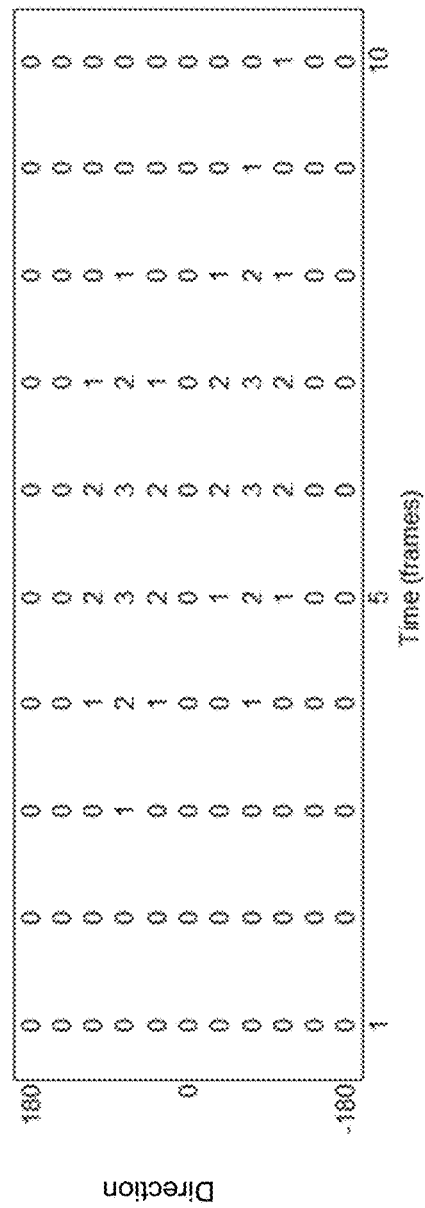
Figure 6D:
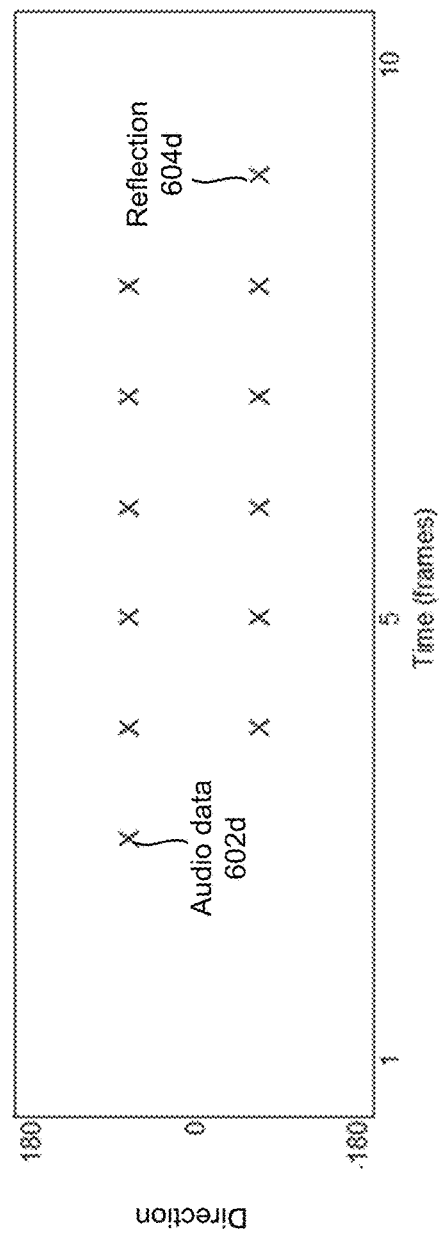

In contrast, with reference to FIGS. 6C and 6D, a reflection 604d may appear in the directional power magnitude data soon after, and with similar power to, the audio data 602d. Such a reflection may be produced when, for example, the device 110 is proximate (e.g., within one meter of) a reflective surface 108, as depicted in (for example) FIG. 4C. The DoA estimation component may similarly process the directional power magnitude data to determine local power maxima to thereby determine the estimated directions of the audio data 602d and the reflection 604d.

Figure 7:
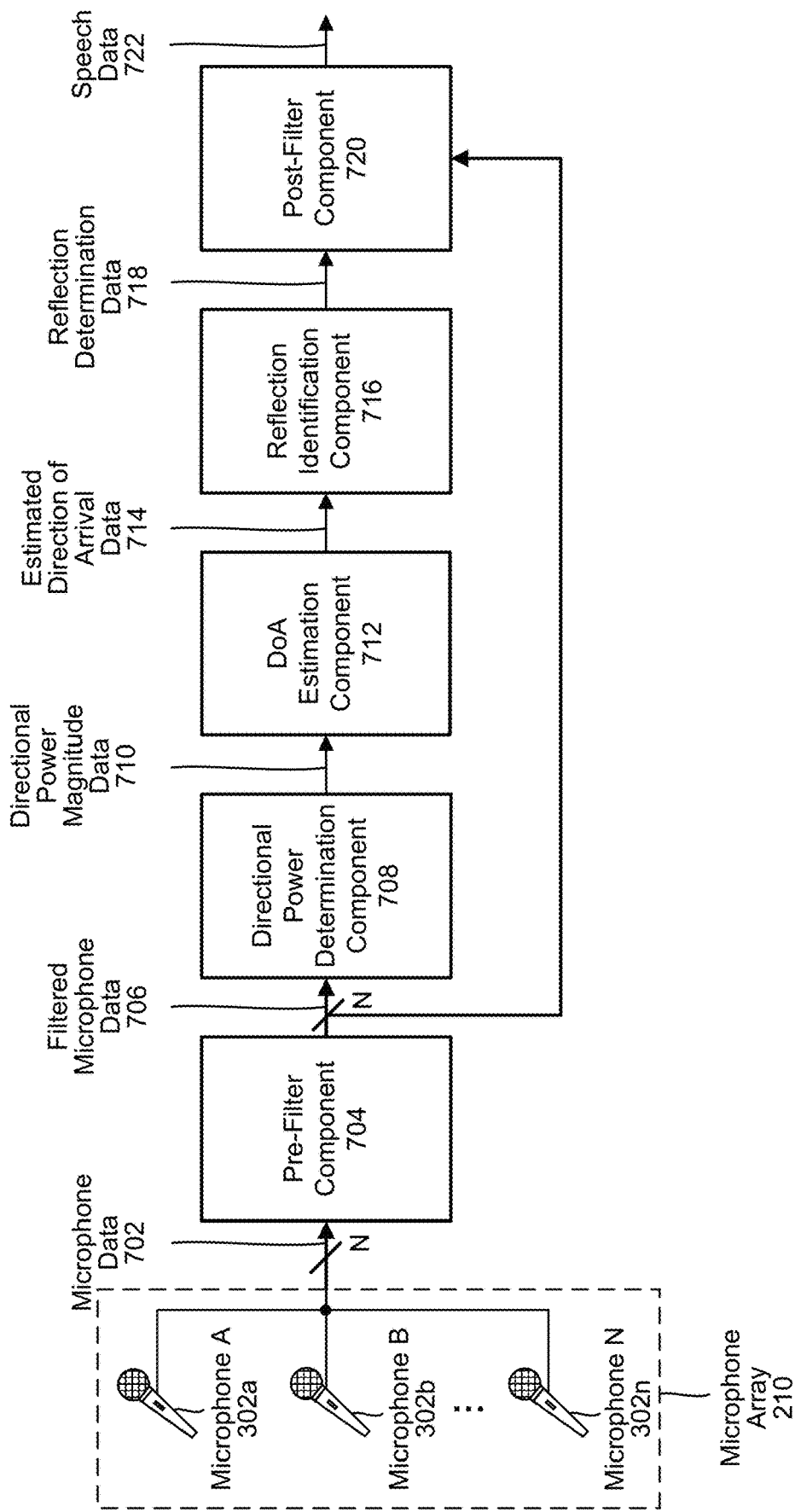
FIG. 7 illustrates a system for identifying reflections using an autonomously motile device according to embodiments of the present disclosure.

FIG. 7 illustrates a system for identifying reflections using an autonomously motile device according to embodiments of the present disclosure. In various embodiments, a pre-filter component 704 receives microphone data 702 from an array 210 of at least two microphones 302. The pre-filter component 704 may process the microphone data 702 to determine filtered microphone data 706. The pre-filter component 704, as explained in greater detail below, may include one or more filters, such as a finite-impulse response filter, that reduce or eliminate noise sounds caused by sources such as an electric fan, vacuum cleaner, or blender, while leaving desired sources of audio, such as human speech, relatively unaffected. The filtered microphone data 706 may thus have a higher signal-to-noise ratio (SNR) than does the microphone data 702. In some embodiments, however, the pre-filter component 704 is not present in the system. The pre-filter component 704 may include noise-suppression components, such as an estimator for determining the energy level, which may be a power spectral density, and/or for determining the SNR of any speech present in the audio data, and a gain determination component for determining a gain of the audio data corresponding to the SNR.

A directional power determination component 708 may process the microphone data 702 and/or the filtered microphone data 706 (if the pre-filter component 704 is present) to determine directional power magnitude data 710, as described above with reference to FIGS. 6A and 6C. The directional power determination component 708 may perform a power-measurement operation, such as a root-mean-square operation, on audio data received from each microphone 302 to determine the power represented by the audio data for each unit of time (such as for each frame). The directional power determination component 708 may further determine additional directional power data by interpolating power between adjacent microphones 302 in the microphone array 210. The directional power determination component 708 may further normalize the directional power magnitude data in accordance with a minimum determined power.

A DoA estimation component 712 may process the directional power magnitude data 710 to determine one or more estimated direction(s) of arrival of one or more audio signals, as illustrated in FIGS. 6B and 6D. As explained above, the DoA estimation component 712 may, for each frame of the directional power magnitude data 710, determine one or more local maxima; each local maximum may thus correspond to an estimated direction of arrival of audio. As explained herein, each direction of arrival may correspond to a direction of a source of audio (e.g., a user) or a reflection of said audio.

A reflection identification component 716 may process the estimated directions of arrival (and associated audio) to determine if a given audio signal corresponds to a reflection. As explained in greater detail with respect to FIG. 8, the reflection identification component 716 may process the times of arrival of two or more audio signals. Because a reflection necessarily travels a greater distance than the direct path of the direct audio, the time of arrival of a reflection will always occur after the time of arrival of the original audio. The reflection identification component 716 may thus consider a later-arrived audio signal as a potential reflection of an earlier-arrived audio signal.

In some embodiments, however, the reflection identification component 716 may consider a later-arrived audio signal not to be a reflection if its time of arrival (compared to an earlier-arrived audio signal) is greater than a threshold time. This threshold time may correspond to a maximum time after which a reflection may be received, given a size of a typical room. For example, if the longest dimension of a typical room is six meters, the maximum distance that a reflection may travel is twelve meters. This distance corresponds to a time of approximately 35 milliseconds; an audio signal that arrives later than that (with respect to an earlier-arrived signal) may thus be a separate source of audio and not a reflection of the first signal. The threshold may be fixed or may be determined dynamically by the device 110 determining a longest possible dimension of a room of the environment 290.

The reflection identification component 716 may further compare one or more characteristics of the audio signals, such as signal magnitude, to determine a degree of correlation therebetween. The characteristics may be magnitudes of a power spectrum, frequency spectrum, magnitude spectrum, and/or phase spectrum. The minimum degree of correlation between a signal and its reflection may be, for example, between 80%-100% correlation. If the degree of correlation is less than the minimum degree, the reflection identification component 716 may determine that a later-arrived audio signal is not a reflection of an earlier-arrived signal.

In some embodiments, the reflection determination data 718 is used to indicate whether a given audio signal should be further processed (using, for example, a speech-processing system) and/or if the device 110 should move in the associated direction of arrival. In other embodiments, a post-filter component 720 further processes the reflection determination data 718 before determining speech data 722 for further processing. As explained in greater detail with respect to FIG. 10, the post-filter component 720 may include a voice-activity detection (VAD) model that processes the audio signal to determine one or more properties thereof indicative of the audio signal representing human speech. The post-filter component 720 may also or instead include an audio event detector for detecting non-speech audio events, such as a door opening or glass breaking.

Figure 8:
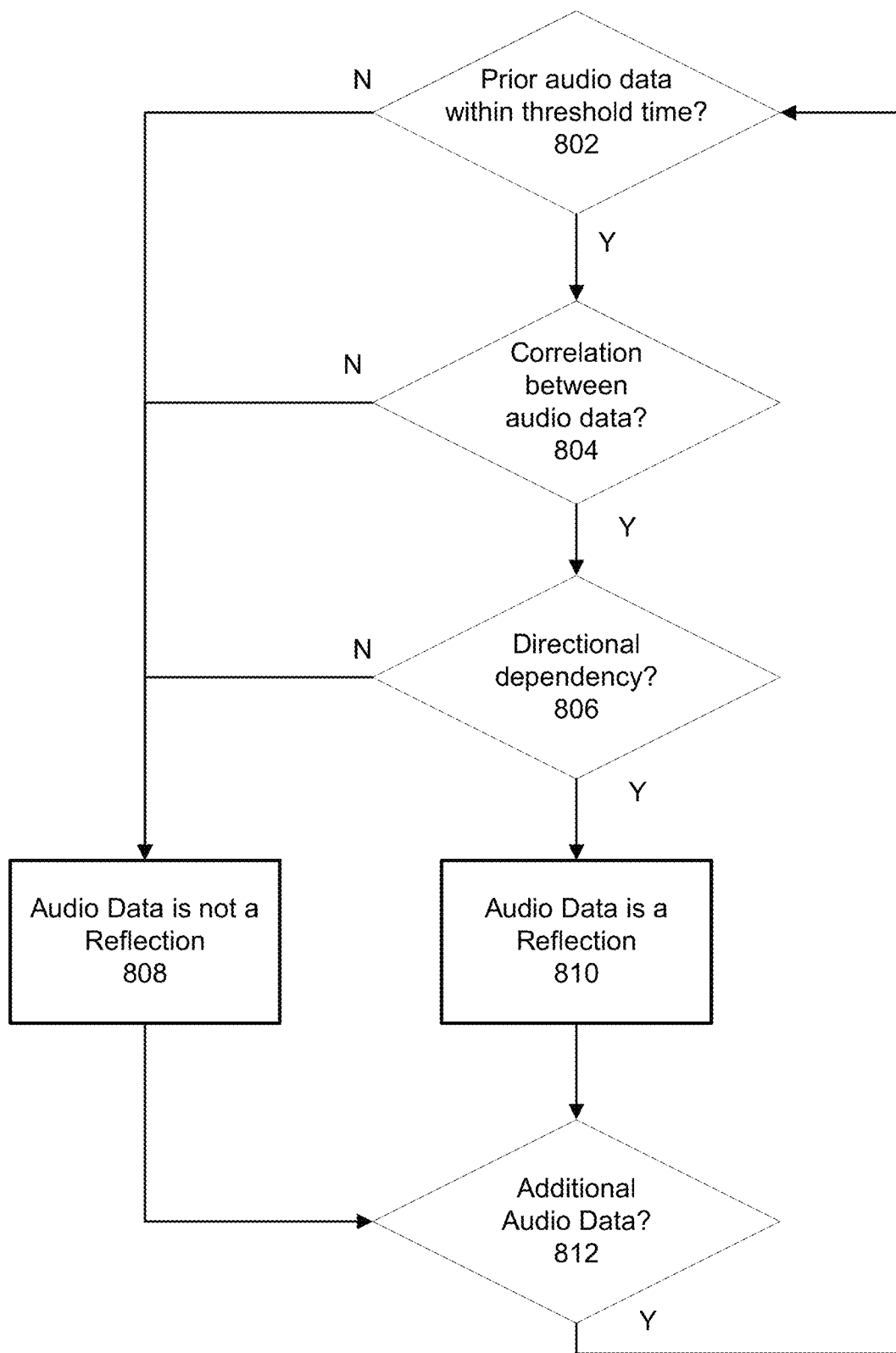
FIG. 8 illustrates a method for identifying reflections using an autonomously motile device according to embodiments of the present disclosure.

FIG. 8 illustrates a method for identifying reflections using a reflection identification component 716 of an autonomously motile device 110 according to embodiments of the present disclosure. In first step, the reflection identification component 716 determines (802) whether one or more later-arrived audio signals arrived within a threshold time of an earlier-arrived signal. As explained above, if the arrival time is greater than the threshold time, the later-arrived audio signal is not a reflection (808) at least because a room of the environment 290 constrains a maximum possible distance (and corresponding travel time) that a reflection may travel. The reflection identification component 716 then determines (804) a degree of correlation between the earlier-arrived audio signal and the later-arrived audio signals. As explained above, a signal and its reflection may have a high degree of correlation, while two independent audio signals may have low correlation. If correlation is low, the audio signal is not a reflection (808). The reflection identification component 716 may then process the audio signals to determine a degree of directional dependency; if this degree is low, the later-arrived audio signal is not a reflection. Directional dependency refers to a movement corresponding to the earlier-arrived signal causing a similar movement in any of its reflections. For example, if a source of audio (such as a user 102) moves in the environment 290, a corresponding movement in any reflections of the audio may be observed. If the source of audio moves but a later-arrived audio signal does not also move, the later-arrived audio signal may not be a reflection of the earlier-arrived signal.

If the later-arrived audio signal arrived after the earlier-arrived audio signal (but within the threshold time), if the correlation between the later-arrived audio signal and the earlier-arrived audio signal is greater than a correlation threshold, and/or if the later-arrived audio signal exhibits directional dependency with respect to the earlier-arrived audio signal, then the reflection identification component 716 determines (810) that the later-arrived audio signal is a reflection of the earlier-arrived audio signal. As explained herein, the determination of the reflection may cause the device 110 to ignore and/or delete data corresponding to the later-arrived audio signal and perform no further action corresponding to the later-arrived audio signal (e.g., move the device 110 in the direction of the later-arrived audio signal). The reflection identification component 716 may repeat (812) some or all of the above processing when and if additional audio signals are received from one or more additional directions.

Figure 9B:
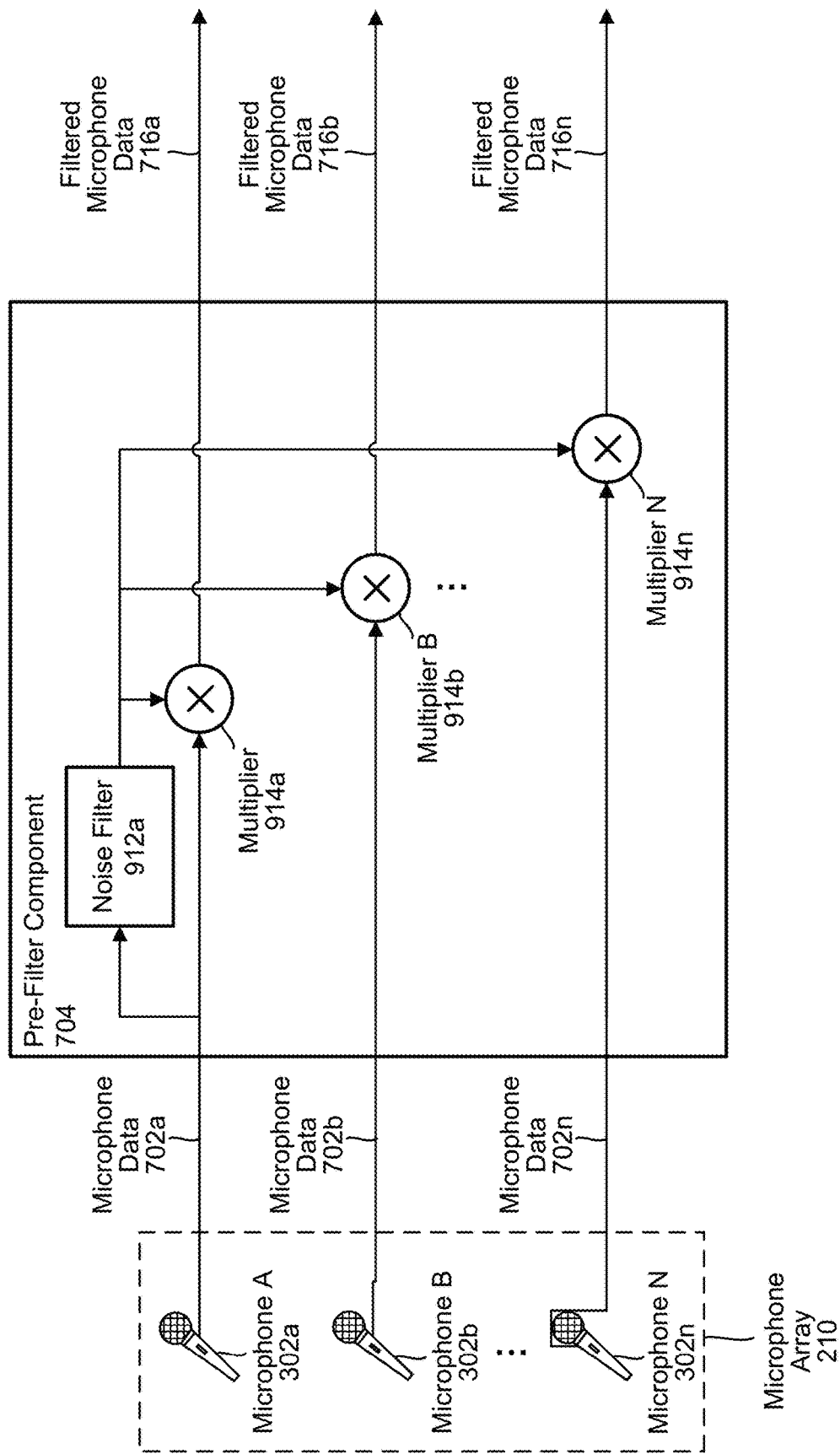

FIGS. 9A and 9B illustrate systems for filtering microphone data using an autonomously motile device according to embodiments of the present disclosure. Referring first to FIG. 9A, as mentioned above, the pre-filter component 704 may include a plurality of noise filters 902; one filter 902 may be allocated to each microphone 302. As mentioned above, each noise filter may be a finite impulse response filter that processes the microphone data 702 to remove and/or suppress noise (from, e.g., a vacuum cleaner, blender, and/or microwave) while passing other signals (from, e.g., a human speaker of an utterance). The pre-filter component 704 may include an estimator for determining the energy level of the microphone data 702, which may be a power spectral density, and/or for determining the SNR of any speech present in the audio data, and a gain determination component for determining a gain of the audio data corresponding to the SNR. A multiplier component 904 may be used to apply the determined gain to the generated output of the noise filters 902 from the microphone data 702. The filtered microphone data 706 determined by the pre-filter component 704 may thus have a higher signal-to-noise ratio (SNR) than the unfiltered microphone data 702.

As illustrated in FIG. 9A, a separate noise filter 902 may be used to process data 702 from each microphone 302 separately. In other embodiments, as illustrated in FIG. 9B, a single noise filter 902 may be used to process data 702 from multiple microphones 302. One noise filter 902 may be used for all microphones 302; in other embodiments, a first noise filter 902 may be used for a first subset of the microphones 302, a second noise filter may be used for a second subset of the microphones 302, and so on. The single noise filter 902 may be used for all microphones 302 because a source of noise may produce sound that is distributed evenly in the environment 290 (e.g., the sound is not associated with a particular direction relative to the device 110), and thus each microphone 302 may receive audio that includes approximately the same representation of the noise.

In some embodiments, however, a first subset of the microphones 302 is disposed on or near a first surface or region of the device 110, and a second subset of the microphones 302 is disposed on or near a second surface or region of the device 110. The first and second surface or region may be associated with different audio characteristics such that they receive different versions of audio from a user 102. For example, the first surface or region may be a top surface of the device 110, and the second surface or region may be a side surface of the device 110. The first and second surfaces or regions may thus be disposed on different sides of a corner of the device 110. Due to being disposed on different surfaces or regions and the potential different audio characteristics associated therewith, a first noise filter 902 may be used for microphones 302 disposed on the first surface or region, and a second noise filter 902 may be used for microphones 302 disposed on the second surface or region. Additional noise filters 902 may be used for additional microphones 302 that exhibit other audio characteristics.

Figure 10:
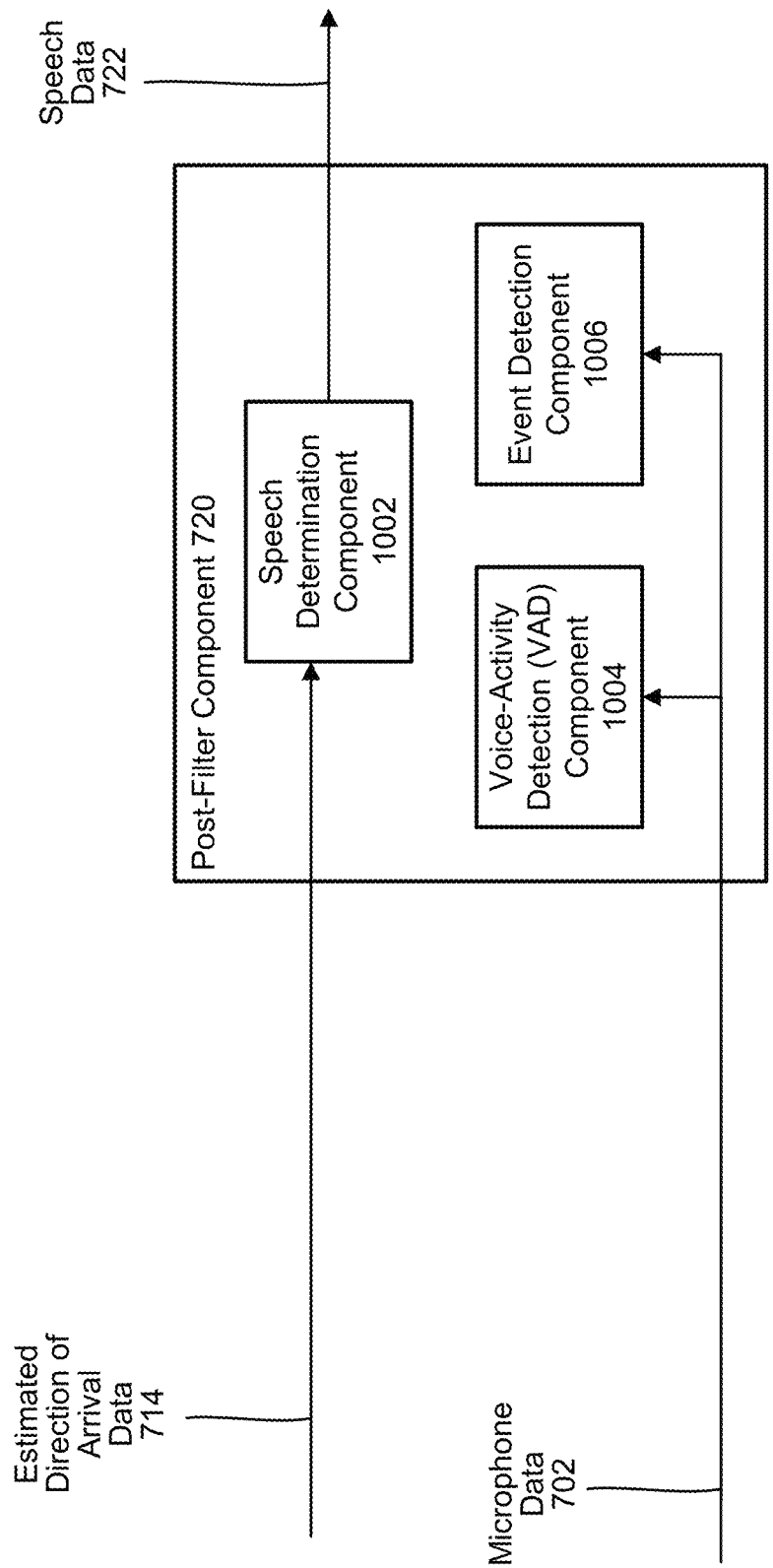
FIG. 10 illustrates a system for post-filtering estimated direction of arrival data using an autonomously motile device according to embodiments of the present disclosure.

FIG. 10 illustrates a system 720 for post-filtering estimated direction of arrival data using an autonomously motile device according to embodiments of the present disclosure. In various embodiments, the post-filter component 720 includes a voice-activity detection component 1004 and/or event-detection component 1006. Each of the components 1004, 1006 may be trained models, such as neural networks, that process the microphone data 702 to determine if audio represented therein corresponds to characteristics of human speech (e.g., its pitch lies in the frequency range 1 kHz-8 kHz) and/or corresponds to characteristics of an event, such as glass shattering. The voice-activity detection component 1004 may indicate that the microphone data includes a representation of human speech; if so, a speech-determination component 1002 may indicate that the estimated direction of arrival corresponds to a user 102. If not, the speech-determination component 1002 may indicate that the estimated direction of arrival corresponds to a reflection. Similarly, if the event-detection component 1006 indicates that the microphone data 702 includes a representation of a non-speech audio event, such as a door opening or glass shattering; if so, the speech determination component 1002 may indicate that the estimated direction of arrival corresponds to a reflection.

Figure 12:
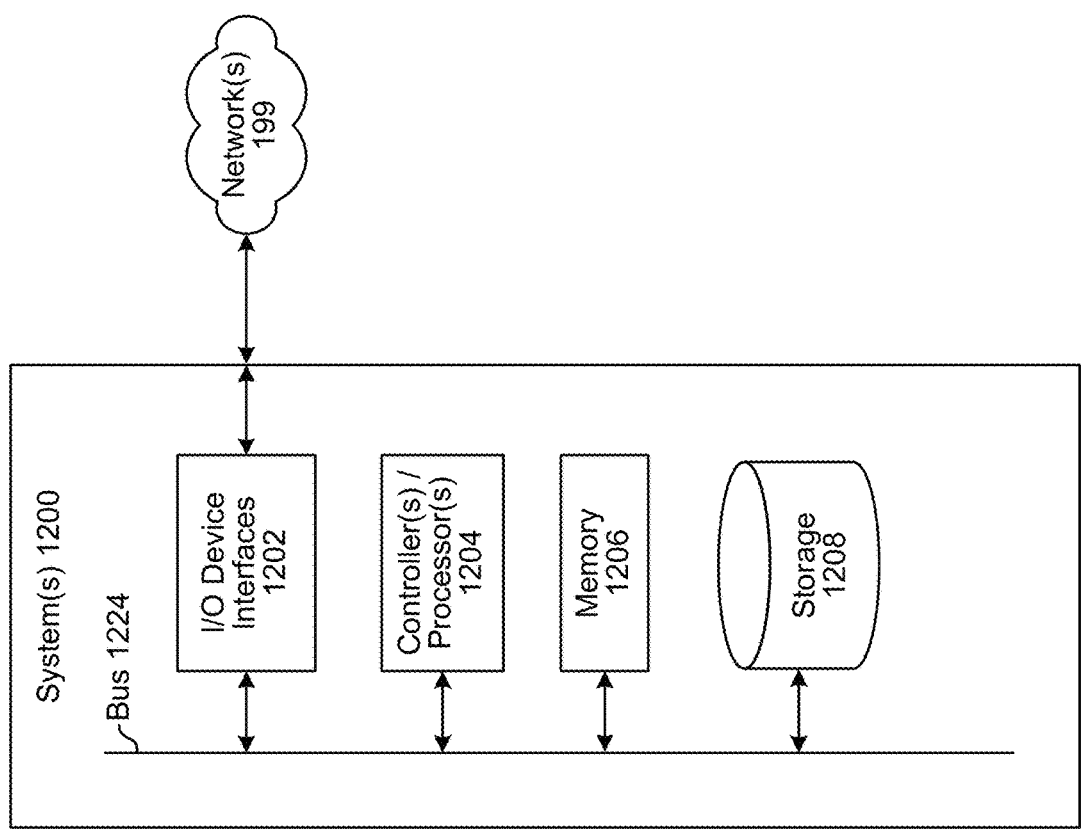
FIG. 12 illustrates a block diagram of a server according to embodiments of the present disclosure.

FIG. 11A is a block diagram conceptually illustrating an autonomously motile device 110 or user device in accordance with the present disclosure. FIG. 12 is a block diagram conceptually illustrating example components of a system 1200, such as remote server, which may assist with creating a map of an environment 290, ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 1200 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the system 1200, such as one or more servers for performing ASR processing, one or more servers for performing NLU processing, one or more skill system(s) for performing actions responsive to user inputs, etc. In operation, each of these devices (or groups of devices) may include computer-readable and computer-executable instructions that reside on the respective server.

FIG. 11A is a block diagram of some components of the autonomously motile device 110 such as network interfaces 1119, sensors 1154, and output devices, according to some implementations. The components illustrated here are provided by way of illustration and not necessarily as a limitation. For example, the autonomously motile device 110 may utilize a subset of the particular network interfaces 1119, output devices, or sensors 1154 depicted here, or may utilize components not pictured. One or more of the sensors 1154, output devices, or a combination thereof may be included on a moveable component that may be panned, tilted, rotated, or any combination thereof with respect to a chassis of the autonomously motile device 110.

The autonomously motile device 110 may include input/output device interfaces 1102 that connect to a variety of components such as an audio output component such as a speaker 1112, a wired headset or a wireless headset (not illustrated), or other component capable of outputting audio. The autonomously motile device 110 may also include an audio capture component. The audio capture component may be, for example, a microphone 1120 or array of microphones, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 214 for displaying content. The autonomously motile device 110 may further include a camera 264/266/212, light, button, actuator, and/or sensor 1154.

The network interfaces 1119 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the autonomously motile device 110 and other devices in the event that communication fails using one or more of the WLAN interface or the PAN interface. For example, in the event the autonomously motile device 110 travels to an area within the environment 290 that does not have Wi-Fi coverage, the autonomously motile device 110 may use the secondary RF link interface to communicate with another device such as a specialized access point, docking station, or other autonomously motile device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1102/1202) may also include and/or communicate with communication components (such as network interface(s) 1119) that allow data to be exchanged between devices such as different physical servers in a collection of servers or other components.

The components of the device(s) 110 and/or the system(s) 1200 may include their own dedicated processors, memory, and/or storage. Alternatively, one or more of the components of the device(s) 110 and/or the system(s) 1200 may utilize the I/O interfaces (1102/1202), processor(s) (1104/1204), memory (1106/1206), and/or storage (1108/1208) of the device(s) 110 and/or the system(s) 1200, respectively.

FIG. 11B illustrates components that may be stored in a memory of an autonomously motile device according to embodiments of the present disclosure. Although illustrated as included in memory 1106, the components (or portions thereof) may also be included in hardware and/or firmware. FIG. 11C illustrates data that may be stored in a storage of an autonomously motile device according to embodiments of the present disclosure. Although illustrated as stored in storage 1108, the data may be stored in memory 1106 or in another component. FIG. 11D illustrates sensors that may be included as part of an autonomously motile device according to embodiments of the present disclosure.

A position determination component 1132 determines position data 1144 indicative of a position 284 of the feature 286 in the environment 290. In one implementation the position 284 may be expressed as a set of coordinates with respect to the first camera 264a/266a/212a. The position determination component 1132 may use a direct linear transformation triangulation process to determine the position 284 of a feature 286 in the environment 290 based on the difference in apparent location of that feature 286 in two images acquired by two cameras 264/266/212 separated by a known distance.

A movement determination module 1133 determines if the feature 286 is stationary or non-stationary. First position data 1144a indicative of a first position 284a of a feature 286 depicted in the first pair of images 282a acquired at time $t_1$ is determined by the position determination component 1132. Second position data 1144b of the same feature 286 indicative of a second position 284b of the same feature 286 as depicted in the second pair of images 282b acquired at time $t_2$ is determined as well. Similar determinations made for data relative to first position 284a and second position 284b may also be made for third position 284c, and so forth.

The movement determination module 1133 may use inertial data from the IMU 1180 or other sensors that provides information about how the autonomously motile device 110 moved between time $t_1$ and time $t_2$. The inertial data and the first position data 1144a is used to provide a predicted position of the feature 286 at the second time. The predicted position is compared to the second position data 1144b to determine if the feature is stationary or non-stationary. If the predicted position is less than a threshold value from the second position 284b in the second position data 1144b, then the feature 286 is deemed to be stationary.

Features 286 that have been deemed to be stationary may be included in the second feature data. The second feature data may thus exclude non-stationary features 286 and comprise a subset of the first feature data 1148 which comprises stationary features 286.

The second feature data may be used by a simultaneous localization and mapping (SLAM) component 1134. The SLAM component 1134 may use second feature data to determine pose data 1145 that is indicative of a location of the autonomously motile device 110 at a given time based on the appearance of features 286 in pairs of images 282. The SLAM component 1134 may also provide trajectory data indicative of the trajectory 280 that is based on a time series of pose data 1145 from the SLAM component 1134.

Other information, such as depth data from a depth sensor, the position data 1144 associated with the features 286 in the second feature data, and so forth, may be used to determine the presence of obstacles 283 in the environment 290 as represented by an occupancy map as represented by occupancy map data 1149.

The occupancy map data 1149 may comprise data that indicates the location of one or more obstacles 283, such as a table, wall, stairwell, and so forth. In some implementations, the occupancy map data 1149 may comprise a plurality of cells with each cell of the plurality of cells representing a particular area in the environment 290. Data, such as occupancy values, may be stored that indicates whether an area of the environment 290 associated with the cell is unobserved, occupied by an obstacle 283, or is unoccupied. An obstacle 283 may comprise an object or feature that prevents or impairs traversal by the autonomously motile device 110. For example, an obstacle 283 may comprise a wall, stairwell, and so forth.

The occupancy map data 1149 may be manually or automatically determined. For example, during a learning phase the user may take the autonomously motile device 110 on a tour of the environment 290, allowing the mapping component 1130 of the autonomously motile device 110 to determine the occupancy map data 1149. The user may provide input data such as tags designating a particular obstacle type, such as "furniture" or "fragile". In another example, during subsequent operation, the autonomously motile device 110 may generate the occupancy map data 1149 that is indicative of locations and types of obstacles such as chairs, doors, stairwells, and so forth as it moves unattended through the environment 290.

Modules described herein, such as the mapping component 1130, may provide various processing functions such as de-noising, filtering, and so forth. Processing of sensor data 1147, such as image data from a camera 264/266/212, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1147. In still another implementation, functions such as those in the Machine Vision Toolbox (MVTB) available using MAT-LAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 1147 or other data. For example, the ANN may be trained using a supervised learning algorithm such that object identifiers are associated with images of particular objects within training images provided to the ANN. Once trained, the ANN may be provided with the sensor data 1147 and produce output indicative of the object identifier.

A navigation map component 1135 uses the occupancy map data 1149 as input to generate a navigation map as represented by navigation map data 1150. For example, the navigation map component 1135 may produce the navigation map data 1150 by inflating or enlarging the apparent size of obstacles 283 as indicated by the occupancy map data 1149.

An autonomous navigation component 1136 provides the autonomously motile device 110 with the ability to navigate within the environment 290 without real-time human interaction. The autonomous navigation component 1136 may implement, or operate in conjunction with, the mapping component 1130 to determine one or more of the occupancy map data 1149, the navigation map data 1150, or other representations of the environment 290.

The autonomously motile device 110 autonomous navigation component 1136 may generate path plan data 1152 that is indicative of a path through the environment 290 from the current location to a destination location. The autonomously motile device 110 may then begin moving along the path.

While moving along the path, the autonomously motile device 110 may assess the environment 290 and update or change the path as appropriate. For example, if an obstacle 283 appears in the path, the mapping component 1130 may determine the presence of the obstacle 283 as represented in the occupancy map data 1149 and navigation map data 1150. The now updated navigation map data 1150 may then be used to plan an alternative path to the destination location.

The autonomously motile device 110 may utilize one or more task components 1141. The task component 1141 comprises instructions that, when executed, provide one or more functions. The task components 1141 may perform functions such as finding a user, following a user, present output on output devices of the autonomously motile device 110, perform sentry tasks by moving the autonomously motile device 110 through the environment 290 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 1119 to connect to a network 199. For example, the network 199 may comprise a wireless local area network, that in turn is connected to a wide area network such as the Internet.

The autonomously motile device 110 may be configured to dock or connect to a docking station. The docking station may also be connected to the network 199. For example, the docking station may be configured to connect to the wireless local area network 199 such that the docking station and the autonomously motile device 110 may communicate. The docking station may provide external power which the autonomously motile device 110 may use to charge a battery of the autonomously motile device 110.

The autonomously motile device 110 may access one or more servers 1200 via the network 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers 1200 for further processing. The servers 1200 may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomous motile devices 110 may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth.

One or more clocks may provide information indicative of date, time, ticks, and so forth. For example, the processor 1104 may use data from the clock to associate a particular time with an action, sensor data 1147, and so forth.

The autonomously motile device 110 may include one or more hardware processors 1104 (processors) configured to execute one or more stored instructions. The processors 1104 may comprise one or more cores. The processors 1104 may include microcontrollers, systems on a chip, field programmable gate arrays, digital signal processors, graphic processing units, general processing units, and so forth.

The autonomously motile device 110 may include one or more communication component 1140 such as input/output (I/O) interfaces 1102, network interfaces 1119, and so forth. The communication component 1140 enable the autonomously motile device 110, or components thereof, to communicate with other devices or components. The communication component 1140 may include one or more I/O interfaces 1102. The I/O interfaces 1102 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1102 may couple to one or more I/O devices. The I/O devices may include input devices such as one or more of a sensor 1154, keyboard, mouse, scanner, and so forth. The I/O devices may also include output devices such as one or more of a motor, light, speaker 1112, display 214, projector, printer, and so forth. In some embodiments, the I/O devices may be physically incorporated with the autonomously motile device 110 or may be externally placed.

The I/O interface(s) 1102 may be configured to provide communications between the autonomously motile device 110 and other devices such as other devices 110, docking stations, routers, access points, and so forth, for example through antenna 1110 and/or other component. The I/O interface(s) 1102 may include devices configured to couple to personal area networks (PANs), local area networks (LANs), wireless local area networks (WLANS), wide area networks (WANs), and so forth. For example, the network interfaces 1119 may include devices compatible with Ethernet, Wi-Fi, Bluetooth, Bluetooth Low Energy, ZigBee, and so forth. The autonomously motile device 110 may also include one or more busses 1124 or other internal communications hardware or software that allow for the transfer of data between the various modules and components of the autonomously motile device 110.

As shown in FIG. 11A, the autonomously motile device 110 includes one or more memories 1106. The memory 1106 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1106 provides storage of computer-readable instructions, data structures, program modules, and other data for the operation of the autonomously motile device 110. A few example functional modules are shown stored in the memory 1106, although the same functionality may alternatively be implemented in hardware, firmware, or as a system on a chip (SoC).

The memory 1106 may include at least one operating system (OS) component 1139. The OS component 1139 is configured to manage hardware resource devices such as the I/O interfaces 1102, the I/O devices, the communication component 1140, and provide various services to applications or modules executing on the processors 1104. The OS component 1139 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Wash.

Also stored in the memory 1106, or elsewhere may be a data store 1108 and one or more of the following modules. These modules may be executed as foreground applications, background tasks, daemons, and so forth. The data store 1108 may use a flat file, database, linked list, tree, executable code, script, or other data structure to store information. In some implementations, the data store 1108 or a portion of the data store 1108 may be distributed across one or more other devices including other devices 110, servers 1200, network attached storage devices, and so forth.

A communication component 1140 may be configured to establish communication with other devices, such as other devices 110, an external server 1200, a docking station, and so forth. The communications may be authenticated, encrypted, and so forth.

Other modules within the memory 1106 may include a safety component 1129, the mapping component 1130, the navigation map component 1135, the autonomous navigation component 1136, the one or more components 1141, a speech processing component 1137, or other components. The components may access data stored within the data store 1108, including safety tolerance data 1146, sensor data 1147, inflation parameters, other data, and so forth.

The safety component 1129 may access the safety tolerance data 1146 to determine within what tolerances the autonomously motile device 110 may operate safely within the environment 290. For example, the safety component 1129 may be configured to stop the autonomously motile device 110 from moving when an extensible mast of the autonomously motile device 110 is extended. In another example, the safety tolerance data 1146 may specify a minimum sound threshold which, when exceeded, stops all movement of the autonomously motile device 110. Continuing this example, detection of sound such as a human yell would stop the autonomously motile device 110. In another example, the safety component 1129 may access safety tolerance data 1146 that specifies a minimum distance from an object that the autonomously motile device 110 is to maintain. Continuing this example, when a sensor 1154 detects an object has approached to less than the minimum distance, all movement of the autonomously motile device 110 may be stopped. Movement of the autonomously motile device 110 may be stopped by one or more of inhibiting operations of one or more of the motors, issuing a command to stop motor operation, disconnecting power from one or more the motors, and so forth. The safety component 1129 may be implemented as hardware, software, or a combination thereof.

The safety component 1129 may control other factors, such as a maximum speed of the autonomously motile device 110 based on information obtained by the sensors 1154, precision and accuracy of the sensor data 1147, and so forth. For example, detection of an object by an optical sensor may include some error, such as when the distance to an object comprises a weighted average between an object and a background. As a result, the maximum speed permitted by the safety component 1129 may be based on one or more factors such as the weight of the autonomously motile device 110, nature of the floor, distance to the object, and so forth. In the event that the maximum permissible speed differs from the maximum speed permitted by the safety component 1129, the lesser speed may be utilized.

The navigation map component 1135 uses the occupancy map data 1149 as input to generate the navigation map data 1150. The navigation map component 1135 may produce the navigation map data 1150 to inflate or enlarge the obstacles 283 indicated by the occupancy map data 1149. One or more inflation parameters may be used during operation. The inflation parameters provide information such as inflation distance, inflation adjustment values, and so forth. In some implementations the inflation parameters may be based at least in part on the sensor field-of-view, sensor blind spot, physical dimensions of the autonomously motile device 110, and so forth.

The speech processing component 1137 may be used to process utterances of the user. Microphones may acquire audio in the presence of the autonomously motile device 110 and may send raw audio data 1143 to an acoustic front end (AFE). The AFE may transform the raw audio data 1143 (for example, a single-channel, 16-bit audio stream sampled at 16 kHz), captured by the microphone, into audio feature vectors that may ultimately be used for processing by various components, such as a wakeword detection module 1138, speech recognition engine, or other components. The AFE may reduce noise in the raw audio data 1143. The AFE may also perform acoustic echo cancellation (AEC) or other operations to account for output audio data that may be sent to a speaker of the autonomously motile device 110 for output. For example, the autonomously motile device 110 may be playing music or other audio that is being received from a network 199 in the form of output audio data. To prevent the output audio interfering with the device's ability to detect and process input audio, the AFE or other component may perform echo cancellation to remove the output audio data from the input raw audio data 1143, or other operations.

The AFE may divide the raw audio data 1143 into frames representing time intervals for which the AFE determines a number of values (i.e., features) representing qualities of the raw audio data 1143, along with a set of those values (i.e., a feature vector or audio feature vector) representing features/qualities of the raw audio data 1143 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 1143, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 1143) may be input into a wakeword detection module 1138 that is configured to detect keywords spoken in the audio. The wakeword detection module 1138 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 1138 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 1138 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 1143 or the audio feature vectors) to one or more server(s) 1200 for speech processing. The audio data corresponding to audio obtained by the microphone may be processed locally on one or more of the processors 1104, sent to a server 1200 for routing to a recipient device or may be sent to the server 1200 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 1135, prior to sending to the server 1200, and so forth.

The speech processing component 1137 may include or access an automated speech recognition (ASR) module. The ASR module may accept as input raw audio data 1143, audio feature vectors, or other sensor data 1147 and so forth and may produce as output the input data comprising a text string or other data representation. The input data comprising the text string or other data representation may be processed by the navigation map component 1135 to determine the command to be executed. For example, the utterance of the command "robot, come here" may result in input data comprising the text string "come here". The wakeword "robot" may be omitted from the input data.

The autonomous navigation component 1136 provides the autonomously motile device 110 with the ability to navigate within the environment 290 without real-time human interaction. The autonomous navigation component 1136 may implement, or operate in conjunction with, the mapping component 1130 to determine the occupancy map data 1149, the navigation map data 1150, or other representation of the environment 290. In one implementation, the mapping component 1130 may use one or more simultaneous localization and mapping ("SLAM") techniques. The SLAM algorithms may utilize one or more of maps, algorithms, beacons, or other techniques to navigate. The autonomous navigation component 1136 may use the navigation map data 1150 to determine a set of possible paths along which the autonomously motile device 110 may move. One of these may be selected and used to determine path plan data 1152 indicative of a path. For example, a possible path that is the shortest or has the fewest turns may be selected and used to determine the path. The path is then subsequently used to determine a set of commands that drive the motors connected to the wheels. For example, the autonomous navigation component 1136 may determine the current location within the environment 290 and determine path plan data 1152 that describes the path to a destination location such as the docking station.

The autonomous navigation component 1136 may utilize various techniques during processing of sensor data 1147. For example, image data 1142 obtained from cameras 264/266/212 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 1104, in response to a command received from one or more network interfaces 1119, as determined from the sensor data 1147, and so forth. For example, an external server 1200 may send a command that is received using the network interface 1119. This command may direct the autonomously motile device 110 to proceed to find a particular user, follow a particular user, and so forth. The autonomously motile device 110 may then process this command and use the autonomous navigation component 1136 to determine the directions and distances associated with carrying out the command. For example, the command to "come here" may result in a task component 1141 sending a command to the autonomous navigation component 1136 to move the autonomously motile device 110 to a particular location near the user and orient the autonomously motile device 110 in a particular direction.

The autonomously motile device 110 may connect to the network 199 using one or more of the network interfaces 1119. In some implementations, one or more of the modules or other functions described here may execute on the processors 1104 of the autonomously motile device 110, on the server 1200, or a combination thereof. For example, one or more servers 1200 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 1108 may store the other data as well. For example, localization settings may indicate local preferences such as language, user identifier data may be stored that allows for identification of a particular user, and so forth.

Figure 11D:
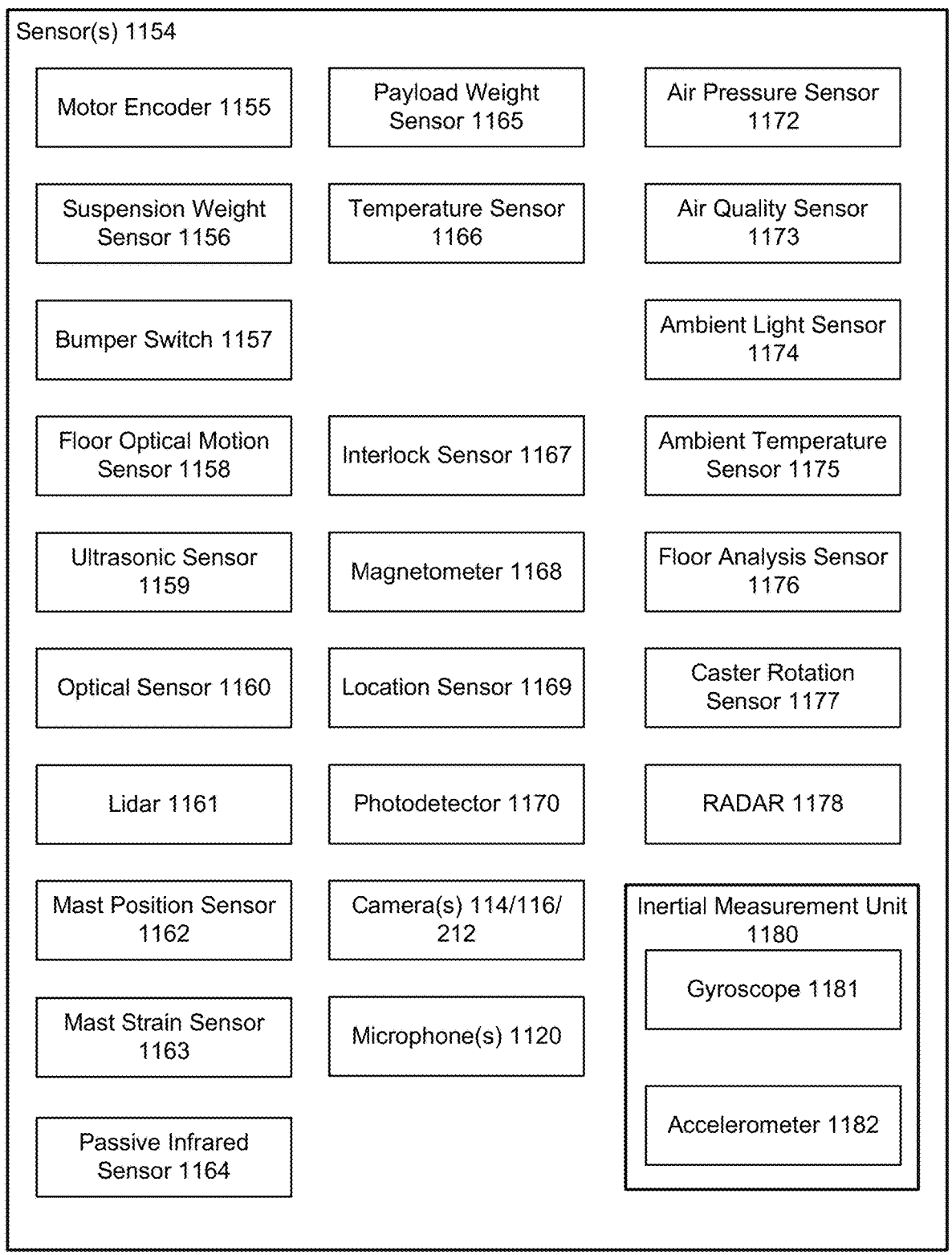
FIG. 11D illustrates sensors that may be included as part of an autonomously motile device according to embodiments of the present disclosure.

As shown in FIG. 11D, the autonomously motile device 110 may include one or more of the following sensors 1154. The sensors 1154 depicted here are provided by way of illustration and not necessarily as a limitation. It is understood that other sensors 1154 may be included or utilized by the autonomously motile device 110, while some sensors 1154 may be omitted in some configurations.

A motor encoder 1155 provides information indicative of the rotation or linear extension of a motor. The motor may comprise a rotary motor, or a linear actuator. In some implementations, the motor encoder 1155 may comprise a separate assembly such as a photodiode and encoder wheel that is affixed to the motor. In other implementations, the motor encoder 1155 may comprise circuitry configured to drive the motor. For example, the autonomous navigation component 1136 may utilize the data from the motor encoder 1155 to estimate a distance traveled.

A suspension weight sensor 1156 provides information indicative of the weight of the autonomously motile device 110 on the suspension system for one or more of the wheels or the caster. For example, the suspension weight sensor 1156 may comprise a switch, strain gauge, load cell, photodetector, or other sensing element that is used to determine whether weight is applied to a particular wheel, or whether weight has been removed from the wheel. In some implementations, the suspension weight sensor 1156 may provide binary data such as a "1" value indicating that there is a weight applied to the wheel, while a "0" value indicates that there is no weight applied to the wheel. In other implementations, the suspension weight sensor 1156 may provide an indication such as so many kilograms of force or newtons of force. The suspension weight sensor 1156 may be affixed to one or more of the wheels or the caster. In some situations, the safety component 1129 may use data from the suspension weight sensor 1156 to determine whether or not to inhibit operation of one or more of the motors. For example, if the suspension weight sensor 1156 indicates no weight on the suspension, the implication is that the autonomously motile device 110 is no longer resting on its wheels, and thus operation of the motors may be inhibited. In another example, if the suspension weight sensor 1156 indicates weight that exceeds a threshold value, the implication is that something heavy is resting on the autonomously motile device 110 and thus operation of the motors may be inhibited.

One or more bumper switches 1157 provide an indication of physical contact between a bumper or other member that is in mechanical contact with the bumper switch 1157. The safety component 1129 utilizes sensor data 1147 obtained by the bumper switches 1157 to modify the operation of the autonomously motile device 110. For example, if the bumper switch 1157 associated with a front of the autonomously motile device 110 is triggered, the safety component 1129 may drive the autonomously motile device 110 backwards.

A floor optical motion sensor 1158 provides information indicative of motion of the autonomously motile device 110 relative to the floor or other surface underneath the autonomously motile device 110. In one implementation, the floor optical-motion sensors 1158 may comprise a light source such as light-emitting diode (LED), an array of photodiodes, and so forth. In some implementations, the floor optical-motion sensors 1158 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 1158 may provide other information, such as data indicative of a pattern present on the floor, composition of the floor, color of the floor, and so forth. For example, the floor optical-motion sensors 1158 may utilize an optoelectronic sensor that may detect different colors or shades of gray, and this data may be used to generate floor characterization data. The floor characterization data may be used for navigation.

An ultrasonic sensor 1159 utilizes sounds in excess of 20 kHz to determine a distance from the sensor 1154 to an object. The ultrasonic sensor 1159 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1159 may provide information indicative of a presence of an object, distance to the object, and so forth. Two or more ultrasonic sensors 1159 may be utilized in conjunction with one another to determine a location within a two-dimensional plane of the object.

In some implementations, the ultrasonic sensor 1159 or a portion thereof may be used to provide other functionality. For example, the emitter of the ultrasonic sensor 1159 may be used to transmit data and the detector may be used to receive data transmitted that is ultrasonic sound. In another example, the emitter of an ultrasonic sensor 1159 may be set to a particular frequency and used to generate a particular waveform such as a sawtooth pattern to provide a signal that is audible to an animal, such as a dog or a cat.

An optical sensor 1160 may provide sensor data 1147 indicative of one or more of a presence or absence of an object, a distance to the object, or characteristics of the object. The optical sensor 1160 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1160 may utilize one or more sensing elements. For example, the optical sensor 1160 may comprise a 4×4 array of light sensing elements. Each individual sensing element may be associated with a field of view that is directed in a different way. For example, the optical sensor 1160 may have four light sensing elements, each associated with a different 10° field-of-view, allowing the sensor to have an overall field-of-view of 40°.

In another implementation, a structured light pattern may be provided by the optical emitter. A portion of the structured light pattern may then be detected on the object using a sensor 1154 such as an image sensor or camera 264/266/212. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1160 may operate as a depth camera, providing a two-dimensional image of a scene, as well as data that indicates a distance to each pixel.

Data from the optical sensors 1160 may be utilized for collision avoidance. For example, the safety component 1129 and the autonomous navigation component 1136 may utilize the sensor data 1147 indicative of the distance to an object in order to prevent a collision with that object.

Multiple optical sensors 1160 may be operated such that their field-of-view overlap at least partially. To minimize or eliminate interference, the optical sensors 1160 may selectively control one or more of the timing, modulation, or frequency of the light emitted. For example, a first optical sensor 1160 may emit light modulated at 30 kHz while a second optical sensor 1160 emits light modulated at 33 kHz.

A lidar 1161 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 1147 may be generated that is indicative of the presence of objects and the relative positions, shapes, and so forth that are visible to the lidar 1161. Data from the lidar 1161 may be used by various modules. For example, the autonomous navigation component 1136 may utilize point cloud data generated by the lidar 1161 for localization of the autonomously motile device 110 within the environment 290.

The autonomously motile device 110 may include a mast. A mast position sensor 1162 provides information indicative of a position of the mast of the autonomously motile device 110. For example, the mast position sensor 1162 may comprise limit switches associated with the mast extension mechanism that indicate whether the mast is at an extended or retracted position. In other implementations, the mast position sensor 1162 may comprise an optical code on at least a portion of the mast that is then interrogated by an optical emitter and a photodetector to determine the distance to which the mast is extended. In another implementation, the mast position sensor 1162 may comprise an encoder wheel that is attached to a mast motor that is used to raise or lower the mast. The mast position sensor 1162 may provide data to the safety component 1129. For example, if the autonomously motile device 110 is preparing to move, data from the mast position sensor 1162 may be checked to determine if the mast is retracted, and if not, the mast may be retracted prior to beginning movement.

A mast strain sensor 1163 provides information indicative of a strain on the mast with respect to the remainder of the autonomously motile device 110. For example, the mast strain sensor 1163 may comprise a strain gauge or load cell that measures a side-load applied to the mast or a weight on the mast or downward pressure on the mast. The safety component 1129 may utilize sensor data 1147 obtained by the mast strain sensor 1163. For example, if the strain applied to the mast exceeds a threshold amount, the safety component 1129 may direct an audible and visible alarm to be presented by the autonomously motile device 110.

The autonomously motile device 110 may include a modular payload bay. A payload weight sensor 1165 provides information indicative of the weight associated with the modular payload bay. The payload weight sensor 1165 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1165 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1165 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1129 may utilize the payload weight sensor 1165 to determine if the modular payload bay has been overloaded. If so, an alert or notification may be issued.

One or more device temperature sensors 1166 may be utilized by the autonomously motile device 110. The device temperature sensors 1166 provide temperature data of one or more components within the autonomously motile device 110. For example, a device temperature sensor 1166 may indicate a temperature of one or more the batteries, one or more motors, and so forth. In the event the temperature exceeds a threshold value, the component associated with that device temperature sensor 1166 may be shut down.

One or more interlock sensors 1167 may provide data to the safety component 1129 or other circuitry that prevents the autonomously motile device 110 from operating in an unsafe condition. For example, the interlock sensors 1167 may comprise switches that indicate whether an access panel is open. The interlock sensors 1167 may be configured to inhibit operation of the autonomously motile device 110 until the interlock switch indicates a safe condition is present.

An inertial measurement unit (IMU) 1180 may include a plurality of gyroscopes 1181 and accelerometers 1182 arranged along different axes. The gyroscope 1181 may provide information indicative of rotation of an object affixed thereto. For example, a gyroscope 1181 may generate sensor data 1147 that is indicative of a change in orientation of the autonomously motile device 110 or a portion thereof.

The accelerometer 1182 provides information indicative of a direction and magnitude of an imposed acceleration. Data such as rate of change, determination of changes in direction, speed, and so forth may be determined using the accelerometer 1182. The accelerometer 1182 may comprise mechanical, optical, micro-electromechanical, or other devices. For example, the gyroscope 1181 in the accelerometer 1182 may comprise a prepackaged solid-state unit.

A magnetometer 1168 may be used to determine an orientation by measuring ambient magnetic fields, such as the terrestrial magnetic field. For example, the magnetometer 1168 may comprise a Hall effect transistor that provides output compass data indicative of a magnetic heading.

The autonomously motile device 110 may include one or more location sensors 1169. The location sensors 1169 may comprise an optical, radio, or other navigational system such as a global positioning system (GPS) receiver. For indoor operation, the location sensors 1169 may comprise indoor position systems, such as using Wi-Fi Positioning Systems (WPS). The location sensors 1169 may provide information indicative of a relative location, such as "living room" or an absolute location such as particular coordinates indicative of latitude and longitude, or displacement with respect to a predefined origin.

A photodetector 1170 provides sensor data 1147 indicative of impinging light. For example, the photodetector 1170 may provide data indicative of a color, intensity, duration, and so forth.

A camera 264/266/212 generates sensor data 1147 indicative of one or more images. The camera 264/266/212 may be configured to detect light in one or more wavelengths including, but not limited to, terahertz, infrared, visible, ultraviolet, and so forth. For example, an infrared camera 264/266/212 may be sensitive to wavelengths between approximately 700 nanometers and 1 millimeter. The camera 264/266/212 may comprise charge coupled devices (CCD), complementary metal oxide semiconductor (CMOS) devices, microbolometers, and so forth. The autonomously motile device 110 may use image data acquired by the camera 264/266/212 for object recognition, navigation, collision avoidance, user communication, and so forth. For example, a pair of cameras 264/266/212 sensitive to infrared light may be mounted on the front of the autonomously motile device 110 to provide binocular stereo vision, with the sensor data 1147 comprising images being sent to the autonomous navigation component 1136. In another example, the camera 264/266/212 may comprise a 10 megapixel or greater camera that is used for videoconferencing or for acquiring pictures for the user.

The camera 264/266/212 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 264/266/212, particularly those associated with navigation or autonomous operation, may utilize a global shutter. In other implementations, the camera(s) 264/266/212 providing images for use by the autonomous navigation component 1136 may be acquired using a rolling shutter and subsequently may be processed to mitigate image artifacts.

One or more microphones 1120 may be configured to acquire information indicative of sound present in the environment 290. In some implementations, arrays of microphones 1120 may be used. These arrays may implement beamforming techniques to provide for directionality of gain. The autonomously motile device 110 may use the one or more microphones 1120 to acquire information from acoustic tags, accept voice input from users, determine a direction of an utterance, determine ambient noise levels, for voice communication with another user or system, and so forth.

An air pressure sensor 1172 may provide information indicative of an ambient atmospheric pressure or changes in ambient atmospheric pressure. For example, the air pressure sensor 1172 may provide information indicative of changes in air pressure due to opening and closing of doors, weather events, and so forth.

An air quality sensor 1173 may provide information indicative of one or more attributes of the ambient atmosphere. For example, the air quality sensor 1173 may include one or more chemical sensing elements to detect the presence of carbon monoxide, carbon dioxide, ozone, and so forth. In another example, the air quality sensor 1173 may comprise one or more elements to detect particulate matter in the air, such as the photoelectric detector, ionization chamber, and so forth. In another example, the air quality sensor 1173 may include a hygrometer that provides information indicative of relative humidity.

An ambient light sensor 1174 may comprise one or more photodetectors or other light-sensitive elements that are used to determine one or more of the color, intensity, or duration of ambient lighting around the autonomously motile device 110.

An ambient temperature sensor 1175 provides information indicative of the temperature of the ambient environment 290 proximate to the autonomously motile device 110. In some implementations, an infrared temperature sensor may be utilized to determine the temperature of another object at a distance.

A floor analysis sensor 1176 may include one or more components that are used to generate at least a portion of floor characterization data. In one implementation, the floor analysis sensor 1176 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1176 may be used by one or more of the safety component 1129, the autonomous navigation component 1136, the task component 1141, and so forth. For example, if the floor analysis sensor 1176 determines that the floor is wet, the safety component 1129 may decrease the speed of the autonomously motile device 110 and generate a notification alerting the user.

The floor analysis sensor 1176 may include other components as well. For example, a coefficient of friction sensor may comprise a probe that comes into contact with the surface and determines the coefficient of friction between the probe and the floor.

A caster rotation sensor 1177 provides data indicative of one or more of a direction of orientation, angular velocity, linear speed of the caster, and so forth. For example, the caster rotation sensor 1177 may comprise an optical encoder and corresponding target that is able to determine that the caster transitioned from an angle of 0° at a first time to 49° at a second time.

The sensors 1154 may include a radar 1178. The radar 1178 may be used to provide information as to a distance, lateral position, and so forth, to an object.

The sensors 1154 may include a passive infrared (PIR) sensor 1164. The PIR 1164 sensor may be used to detect the presence of users, pets, hotspots, and so forth. For example, the PIR sensor 1164 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 290 to provide landmarks for the autonomous navigation component 1136. One or more touch sensors may be utilized to determine contact with a user or other objects.

The autonomously motile device 110 may include one or more output devices. A motor (not shown) may be used to provide linear or rotary motion. A light 258 may be used to emit photons. A speaker 1112 may be used to emit sound. A display 214 may comprise one or more of a liquid crystal display, light emitting diode display, electrophoretic display, cholesteric liquid crystal display, interferometric display, and so forth. The display 214 may be used to present visible information such as graphics, pictures, text, and so forth. In some implementations, the display 214 may comprise a touchscreen that combines a touch sensor and a display 214.

In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 1200 as described herein, are illustrative, and may be located as a stand-alone device or may be included, in whole or in part, as a component of a larger device or system.

Figure 13:
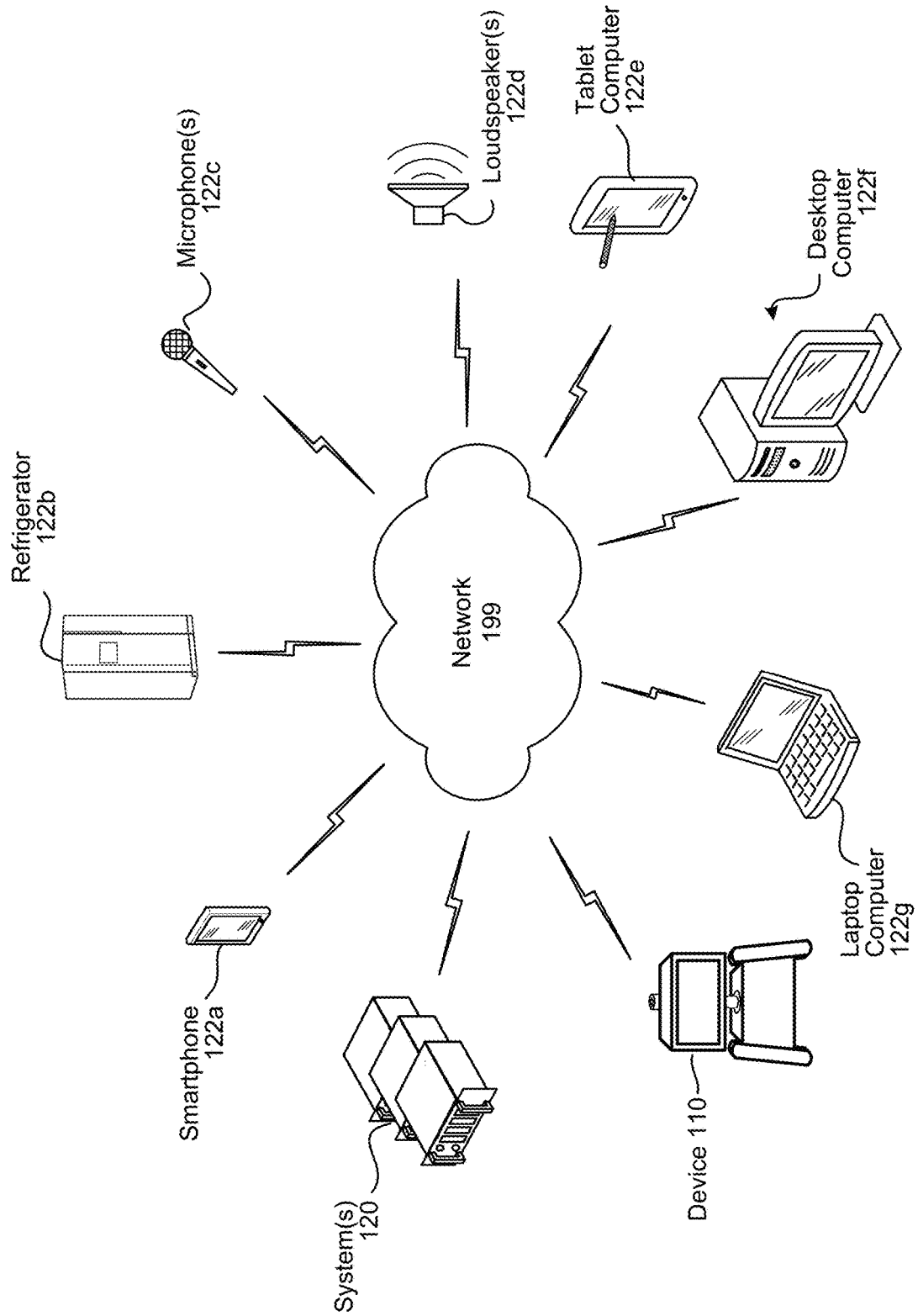
FIG. 13 illustrates a network that includes an autonomously motile device according to embodiments of the present disclosure.

As illustrated in FIG. 13 and as discussed herein, the autonomously motile device 110 may communicate, using the network 199, with the system 1200 and/or a user device. The network(s) 199 may include a local or private network or may include a wide network such as the Internet. The devices may be connected to the network(s) 199 through either wired or wireless connections. Example user devices include a cellular phone 122a, a refrigerator 122b, a microphone 122c, a loudspeaker 122d, a tablet computer 122e, a desktop computer 122f, and a laptop computer 122g, which may be connected to the network(s) 199 through a wireless service provider, over a Wi-Fi or cellular network connection, or the like. Other devices are included as network-connected support devices, such as the system(s) 1200, the skill system(s), and/or others.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end, which comprises, among other things, analog and/or digital filters (e.g., filters configured as firmware to a digital signal processor).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for detecting reflections in received audio using an autonomously motile device, the method comprising:
receiving, from a first microphone of a microphone array of the autonomously motile device, first audio data representing speech;
receiving, from a second microphone of the microphone array, second audio data representing the speech;
processing a first portion of the first audio data and a first portion of the second audio data to determine a first direction of arrival of first audio corresponding to a first representation of an utterance;
processing a second portion of the first audio data and a second portion of the second audio data to determine a second direction of arrival of second audio corresponding to a second representation of the utterance, wherein the second direction is different from the first direction and the second representation of the utterance is different from the first representation of the utterance;
determining that a difference between a first time of arrival of the first audio and a second time of arrival of the second audio is less than a threshold time;
determining that a degree of correlation between the first audio and the second audio is greater than a correlation threshold;
determining that the second audio represents a reflection of the first audio;
based at least in part on the second audio representing a reflection of the first audio, determining that a source of the speech is located in the first direction; and
causing movement of the autonomously motile device in the first direction.

2. The computer-implemented method of claim 1, wherein determining that the degree of correlation is greater than the correlation threshold comprises:
determining a first power spectrum corresponding to the first audio;
determining a second power spectrum corresponding to the second audio; and
determining a difference between a first magnitude of the first power spectrum and a second magnitude of the second power spectrum to determine the degree of correlation.

3. A computer-implemented method comprising:
receiving, from a microphone array of a device, audio data representing an utterance;
determining that the audio data includes a first representation of the utterance corresponding to a first direction relative to the device;
determining that the audio data includes a second representation of the utterance corresponding to a second direction relative to the device, wherein the second direction is different from the first direction and the second representation of the utterance is different from the first representation of the utterance;
determining that the second representation of the utterance corresponds to a reflection of the first representation of the utterance; and
based at least in part on the second representation of the utterance corresponding to a reflection of the first representation of the utterance, determining an output of the device corresponding to the first direction.

4. The computer-implemented method of claim 3, wherein determining that the audio data includes the first representation of the utterance comprises:
determining, using the audio data and based at least in part on a physical dimension of the microphone array, power magnitude data corresponding to the first direction and corresponding to a first period of time; and
determining a maximum of the power magnitude data occurring during the first period of time.

5. The computer-implemented method of claim 3, wherein determining that the second representation of the utterance corresponds to the reflection comprises:
determining a first time of arrival of first audio including the first representation at the device;
determining a second time of arrival of second audio including the second representation at the device;
determining that the second time occurs after the first time; and determining that a difference between the first time and the second time satisfies a condition.

6. The computer-implemented method of claim 3, wherein determining that the second representation of the utterance corresponds to the reflection comprises:
   determining a first magnitude spectrum corresponding to first audio including the first representation;
   determining a second magnitude spectrum corresponding to second audio including the second representation; and
   determining that a degree of correlation between the first magnitude spectrum and the second magnitude spectrum is greater than a threshold.

7. The computer-implemented method of claim 3, wherein determining that the second representation of the utterance corresponds to the reflection comprises:
   determining that the first representation corresponds to a movement of a source of the utterance in an environment; and
   determining that the second representation corresponds to the movement.

8. The computer-implemented method of claim 3, further comprising at least one of:
   causing, based on the output, movement of the device in the first direction; or
   illuminating, based on the output, a component of the device indicating the first direction.

9. The computer-implemented method of claim 3, wherein determining that the second representation of the utterance corresponds to the reflection comprises:
   determining, using a voice-activity detection component, that the audio data corresponds to human speech.

10. The computer-implemented method of claim 3, further comprising:
    estimating, using a first filter, a source of noise proximate to the device; and
    processing, using the first filter, first data from a first microphone of the microphone array to determine at least a portion of the audio data.

11. The computer-implemented method of claim 10, further comprising at least one of:
    processing, using the first filter, second data from a second microphone of the microphone array to determine at least a second portion of the audio data; or
    processing, using a second filter, the second data to determine at least the second portion of the audio data.

12. A device comprising:
    at least one processor; and
    at least one memory including instructions that, when executed by the at least one processor, cause the device to:
      receive, from a microphone array of the device, audio data representing an utterance;
      determine that the audio data includes a first representation of the utterance corresponding to a first direction relative to the device;
      determine that the audio data includes a second representation of the utterance corresponding to a second direction relative to the device, wherein the second direction is different from the first direction and the second representation of the utterance is different from the first representation of the utterance;
      determine that the second representation of the utterance corresponds to a reflection of the first representation of the utterance; and
      based at least in part on the second representation of the utterance corresponding to a reflection of the first representation of the utterance, determine an output of the device corresponding to the first direction.

13. The device of claim 12, wherein the at least one memory further comprises instructions that determine that the audio data includes the first representation and that, when executed by the at least one processor, further cause the device to:
    determine, using the audio data and based at least in part on a physical dimension of the microphone array, power magnitude data corresponding to the first direction and corresponding to a first period of time; and
    determine a maximum of the power magnitude data occurring during the first period of time.

14. The device of claim 12, wherein the at least one memory further comprises instructions that determine that the second representation of the utterance corresponds to the reflection and that, when executed by the at least one processor, further cause the device to:
    determine a first time of arrival of first audio including the first representation at the device;
    determine a second time of arrival of second audio including the second representation at the device;
    determine that the second time occurs after the first time; and
    determine that a difference between the first time and the second time satisfies a condition.

15. The device of claim 12, wherein the at least one memory further comprises instructions that determine that the second representation of the utterance corresponds to the reflection and that, when executed by the at least one processor, further cause the device to:
    determine a first magnitude spectrum corresponding to first audio including the first representation;
    determine a second magnitude spectrum corresponding to second audio including the second representation; and
    determine that a degree of correlation between the first magnitude spectrum and the second magnitude spectrum is greater than a threshold.

16. The device of claim 12, wherein the at least one memory further comprises instructions that determine that the second representation of the utterance corresponds to the reflection and that, when executed by the at least one processor, further cause the device to:
    determine that the first representation corresponds to a movement of a source of the utterance in an environment; and
    determine that the second representation corresponds to the movement.

17. The device of claim 12, wherein the at least one memory further comprises instructions that, when executed by the at least one processor, further cause the device to:
    cause, based on the output, movement of the device in the first direction; or
    determine, based on the output, a component of the device indicating the first direction.

18. The device of claim 12, wherein the at least one memory further comprises instructions that the second representation of the utterance corresponds to the reflection and that, when executed by the at least one processor, further cause the device to:
    determine, using a voice-activity detection component, that the audio data corresponds to human speech.

19. The device of claim 12, wherein the at least one memory further comprises instructions that, when executed by the at least one processor, further cause the device to:
    estimate, using a first filter, a source of noise proximate to the device; and process, using the first filter, first data from a first microphone of the microphone array to determine at least a portion of the audio data.

20. The device of claim 19, wherein the at least one memory further comprises instructions that, when executed by the at least one processor, further cause the device to:
process, using the first filter, second data from a second microphone of the microphone array to determine at least a second portion of the audio data; or
process, using a second filter, the second data to determine at least the second portion of the audio data.

21. The computer-implemented method of claim 3, further comprising:
causing speech processing to be performed using the first representation of the utterance but not the second representation of the utterance.

22. The device of claim 12, wherein the at least one memory further comprises instructions that, when executed by the at least one processor, further cause the device to:
cause speech processing to be performed using the first representation of the utterance but not the second representation of the utterance.

* * * * *